(12) United States Patent
Viglione et al.

(10) Patent No.: US 8,313,255 B2
(45) Date of Patent: Nov. 20, 2012

(54) SHUTTER ASSEMBLY WITH DRIVE RING-MOUNTED MAGNET

(75) Inventors: David Viglione, Rochester, NY (US); Stephen T. Pasquarella, Rochester, NY (US)

(73) Assignee: VA, Inc., Rochester, NY (US)

( * ) Notice: Subject to any disclaimer, the term of this patent is extended or adjusted under 35 U.S.C. 154(b) by 452 days.

(21) Appl. No.: 12/359,941

(22) Filed: Jan. 26, 2009

(65) Prior Publication Data
US 2010/0189432 A1 Jul. 29, 2010

(51) Int. Cl.
*G03B 9/08* (2006.01)
(52) U.S. Cl. .......................... 396/463; 396/471
(58) Field of Classification Search .................. 396/463, 396/467, 468, 471, 493, 508
See application file for complete search history.

(56) References Cited

U.S. PATENT DOCUMENTS

| | | | |
|---|---|---|---|
| 3,533,345 A | 10/1970 | Starp | |
| 3,595,553 A | 7/1971 | Vincent | |
| 3,664,251 A | 5/1972 | Vincent | |
| 4,060,313 A | 11/1977 | Kondo | |
| 4,121,235 A | 10/1978 | Fujita et al. | |
| 4,265,530 A | 5/1981 | Petersen | |
| 4,466,723 A | 8/1984 | Ikari et al. | |
| 4,702,583 A | 10/1987 | Yoshino et al. | |
| 4,724,452 A | 2/1988 | Mody et al. | |
| 4,772,904 A | 9/1988 | Otsuka et al. | |
| 4,881,093 A * | 11/1989 | Dowe | 396/463 |
| 5,117,137 A | 5/1992 | Kobayashi | |
| 5,173,728 A | 12/1992 | Sangregory et al. | |
| 5,264,896 A * | 11/1993 | Lee et al. | 396/235 |
| 5,337,110 A | 8/1994 | Dowe | |
| 5,489,959 A | 2/1996 | Akada | |
| 5,555,059 A * | 9/1996 | Seo et al. | 396/463 |
| 5,705,873 A | 1/1998 | Sato | |
| 6,033,131 A | 3/2000 | Ghosh et al. | |
| 6,652,165 B1 | 11/2003 | Pasquarella et al. | |
| 6,714,733 B2 | 3/2004 | Kobayashi | |
| 6,806,985 B1 | 10/2004 | Devenyi | |
| 7,104,707 B2 | 9/2006 | Miyawaki | |
| 7,259,922 B2 | 8/2007 | Fukasawa | |

(Continued)

FOREIGN PATENT DOCUMENTS

GB 2235541 A 3/1991

(Continued)

OTHER PUBLICATIONS

McLeod, et al.: Advanced electro-mechanical micro-shutters for thermal infrared night vision imaging and targeting systems, pp. 1-10.

(Continued)

*Primary Examiner* — Clayton E LaBalle
*Assistant Examiner* — Warren Fenwick
(74) *Attorney, Agent, or Firm* — Finnegan, Henderson, Farabow, Garrett & Dunner LLP

(57) ABSTRACT

A shutter assembly includes a drive ring having a permanent magnet disposed thereon. The shutter assembly also includes a solenoid defining a gap between first and second magnetic poles thereof, the drive ring being disposed coplanar with the solenoid and being rotatable in response to a magnetic field created between the first and second magnetic poles. The shutter assembly also includes a plurality of shutter blades configured to transition between an open position and a closed position in response to rotation of the drive ring. The shutter assembly further includes a base plate separating the plurality of shutter blades from at least one of the drive ring and the solenoid.

16 Claims, 13 Drawing Sheets

U.S. PATENT DOCUMENTS

| | | | |
|---|---|---|---|
| 2003/0062788 A1 | 4/2003 | Aoshima | |
| 2004/0008425 A1 | 1/2004 | Miyawski | |
| 2004/0258405 A1 | 12/2004 | Shiratori et al. | |
| 2005/0041137 A1 | 2/2005 | Ezawa et al. | |
| 2007/0110432 A1* | 5/2007 | Viglione et al. | 396/465 |
| 2007/0297791 A1* | 12/2007 | Fukasawa | 396/506 |

FOREIGN PATENT DOCUMENTS

| | | |
|---|---|---|
| WO | 2007089589 A2 | 8/2007 |

OTHER PUBLICATIONS

Melles Griot Custom Shutters, www.mellesgriot.com, pp. 1-2.

Melexis: MLX90316 Rotary Position Sensor IC (3 pages). www.melexis.com/Sensor_ICs_Hall_effect/Triaxis_Hall_ICs/MLX90316_566.aspx.

Office Action in corresponding Chinese Patent Application No. 200680050297.6, and an English language Summary of the Office Action (7 pages).

Supplementary European Search Report dated Jun. 8, 2009, re European Patent Application No. EP 06839850.2 (4 pages).

International Search Report and Written Opinion dated Mar. 28, 2008, re International Application No. PCT/US06/60186 (8 pages).

Notification of Transmittal of the International Search Report and the Written Opinion of the International Searching Authority, or the Declaration dated Jan. 4, 2010, re International Application No. PCT/US2009/036872 (4 pages).

International Search Report dated Jan. 4, 2010, re International Application No. PCT/US2009/036872 (3 pages).

Written Opinion of the International Searching Authority dated Jan. 4, 2010, re International Application No. PCT/US2009/036872 (5 pages).

USPTO Office Action dated Jan. 6, 2010, re corresponding U.S. Appl. No. 12/046,958 (10 pages).

* cited by examiner

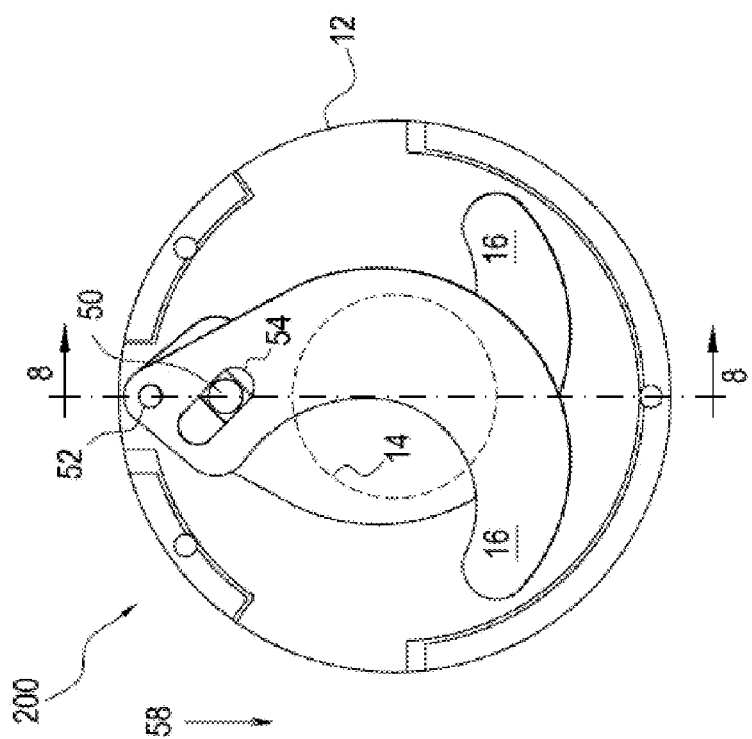
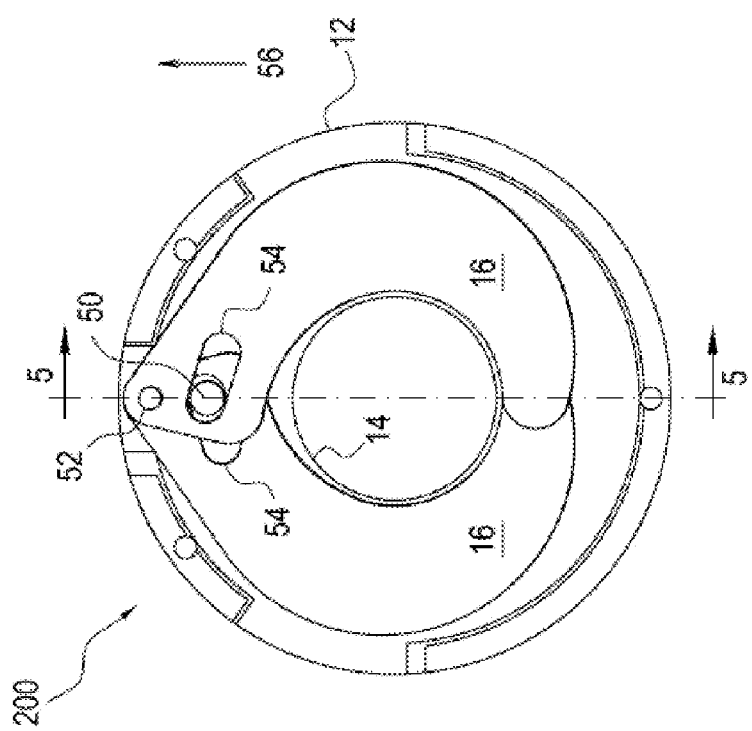

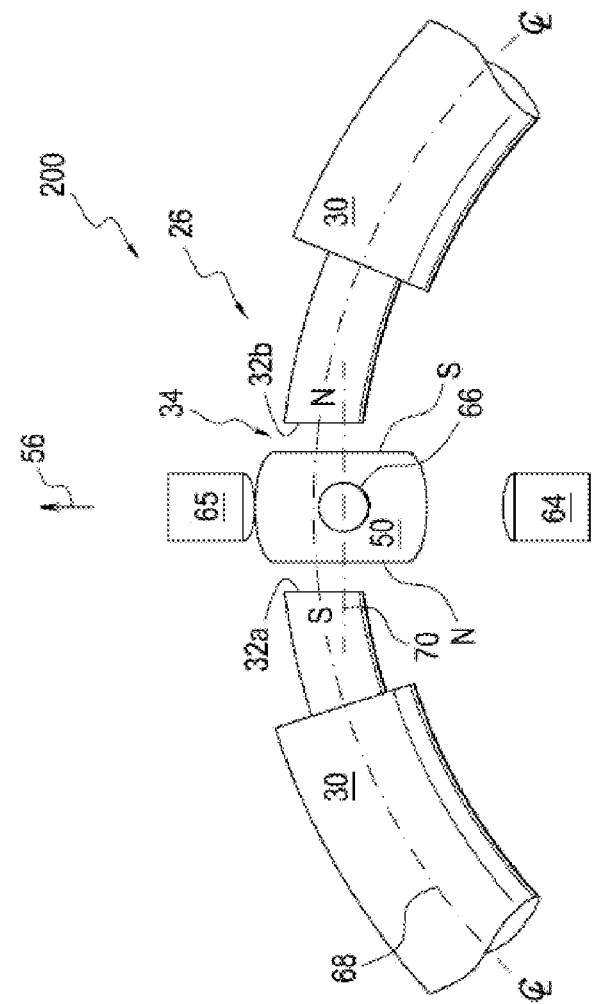
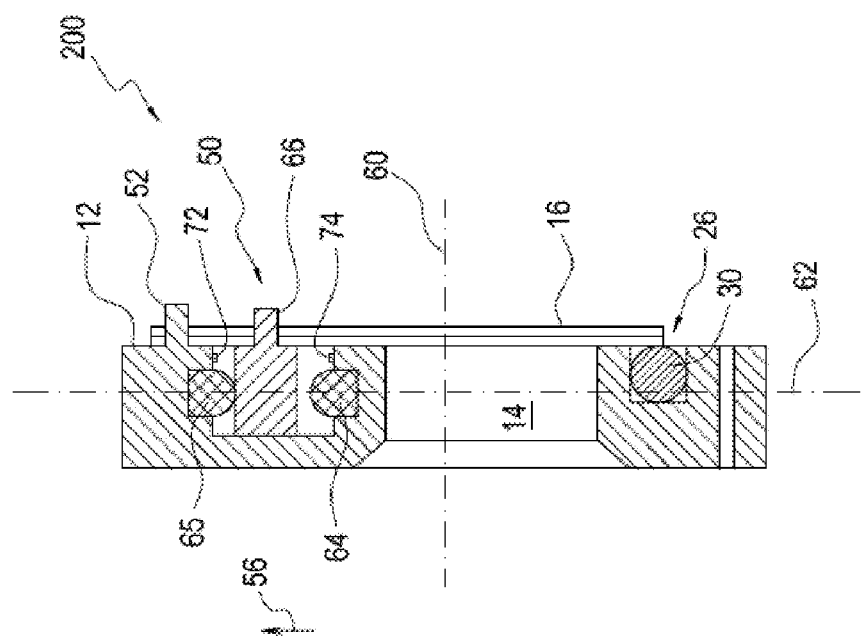

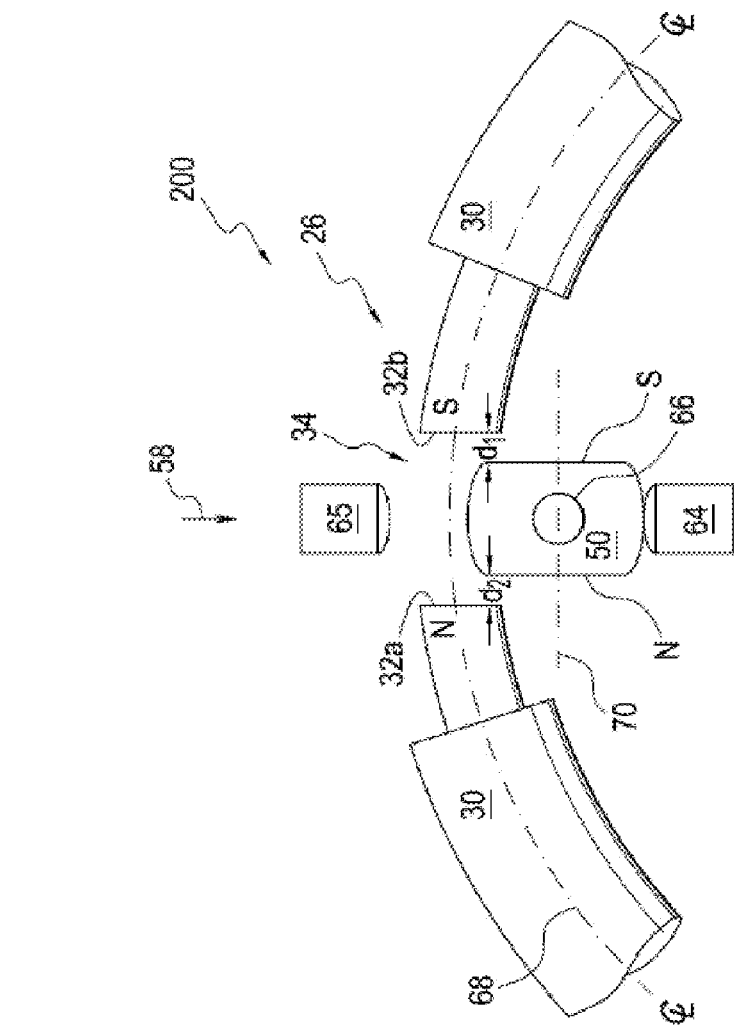
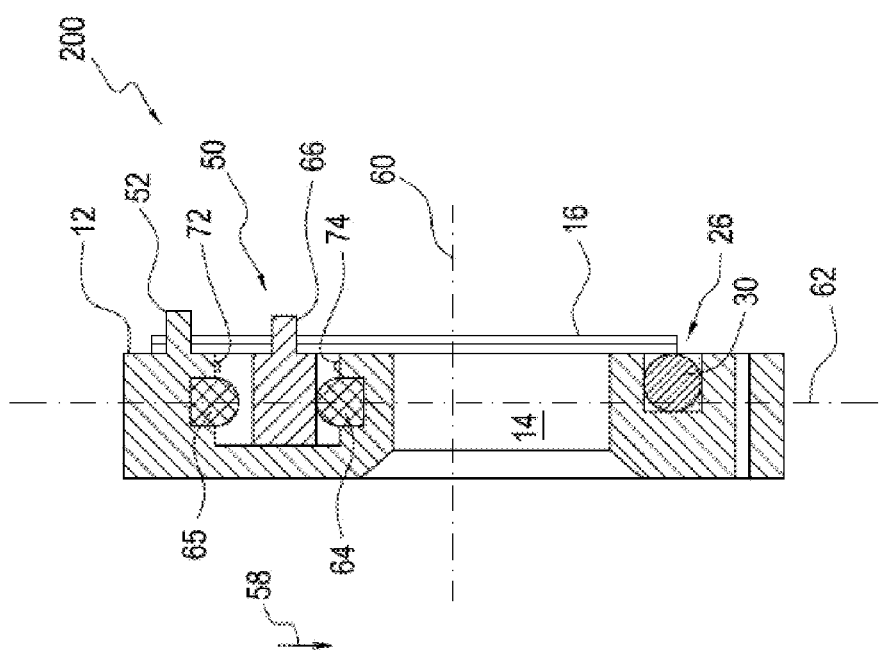
FIG. 9
FIG. 8

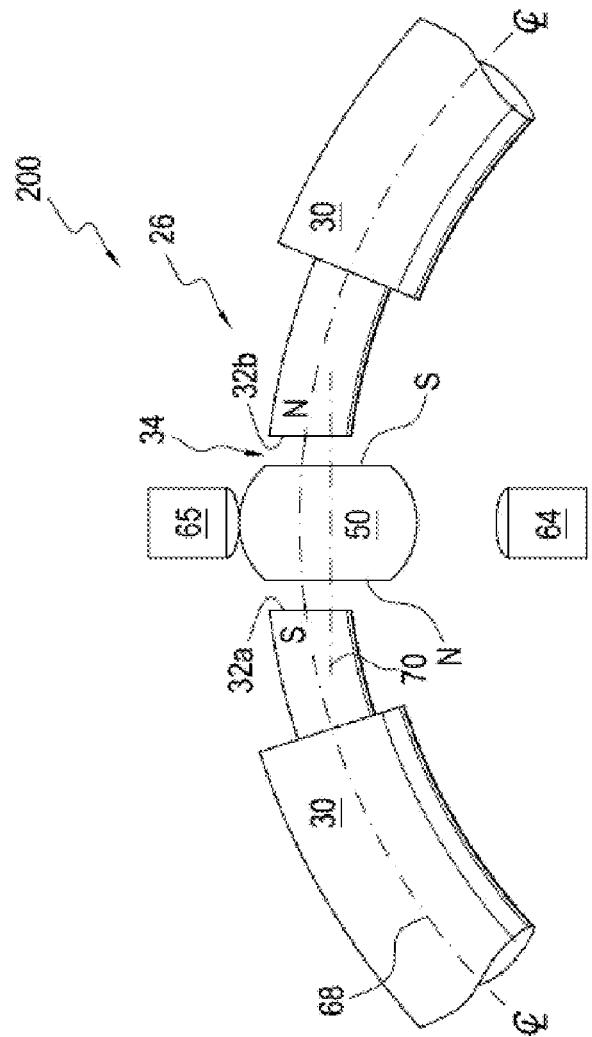
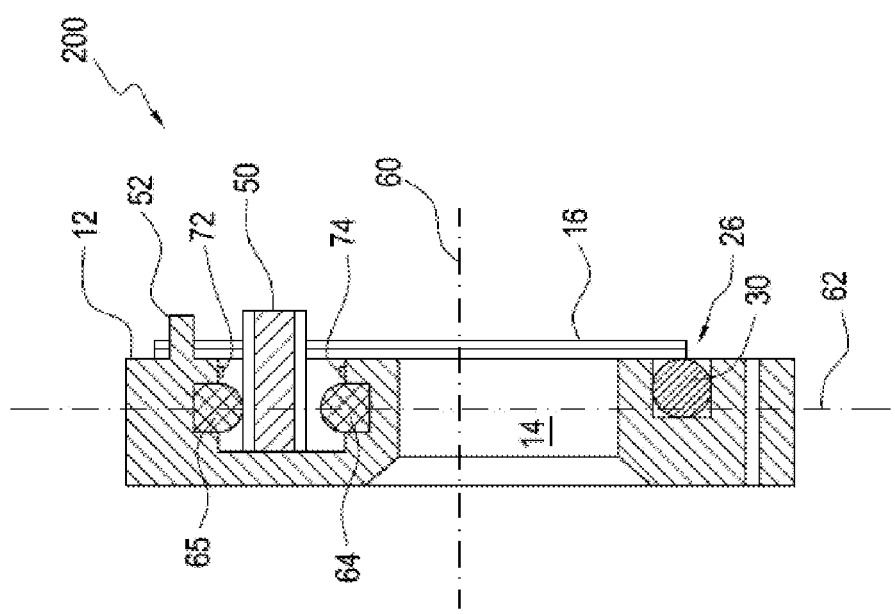
FIG. 11
FIG. 10

SHUTTER ASSEMBLY WITH DRIVE RING-MOUNTED MAGNET

BACKGROUND OF THE INVENTION

1. Field of the Invention

The present invention relates generally to shutter assemblies and more particularly to photographic-type shutter assemblies that rely on electromagnetic forces to open and close.

2. Description of Related Art

Electrically operated lens shutters used in various types of photographic and laboratory equipment are well known in the art. Lens shutters especially adapted for high speed opening and closing can operate in fractions of a second. An open/close cycle can take place in 30-40 milliseconds or less and repeated cycles at frequencies of 30 cycles per second are common.

Lens shutters generally are of two types. In one type, a so-called "guillotine" shutter has one or two thin, metal blades or leaves arranged to cover a lens opening. Pivot connections allow each blade to swing between a closed position where the blades cover the lens opening and an open position where the blades are drawn aside from the lens opening.

In a second type of shutter, a plurality of pivotally mounted blades are arranged around the lens opening. Each blade is connected to a rotatable drive ring. In the operation of these shutters, the rotation of the drive ring in one direction causes the blades to swing in unison to an open position. Counter rotation of the ring swings the blades to a closed position over the lens opening after exposure. Generally a linear electric motor is used to activate the shutter. When activated, the linear motor pulls on a lever arm that rotates the drive ring to open the shutter. To close the shutter the motor is deactivated and a spring causes the counter rotation of the drive ring to close the shutter. As noted above, shutters of this sort can cycle open and close 30 times per second.

In some applications, however, space is limited. Space limitations, particularly in the region of the shutter opening, dictate the parameters of size and placement of components for opening and closing the shutter. For example, components placed near the shutter opening must have a relatively low profile so as not to interfere with the cone angle of the light passing through the open shutter. Space limitations also complicate the substitution of one shutter assembly for another as in changing shutter size while maintaining the same base structure.

As noted above, existing shutter assemblies typically mechanically couple a linear electric motor to the shutter for opening and closing the lens opening. However, for proper operation, particularly at high speeds, the mechanical linkage must be precisely made and the movement of the linkage must be dampened by relatively large dampening assemblies.

Alternatively, other known shutter assemblies may utilize electromagnetic energy to open and close the shutter. For example, such assemblies may include a permanent magnet disposed on a drive ring and a pair of spaced solenoids disposed above the permanent magnet. A polarity of an operative end of the first solenoid can be opposite that of an operative end of the second solenoid, such that the permanent magnet is attracted to one of the solenoids and repelled by the other. The solenoids can be energized to switch polarities, to effectuate a movement of the permanent magnet between a first position proximate the first solenoid and a second position proximate the second solenoid.

Such assemblies may be configured to open and close shutters at relatively high speeds without damaging the shutter blades. However, such assemblies generally require that the solenoid be situated in a tier or layer of the shutter assembly separate from, and either above or below, the permanent magnet. This necessarily increases the overall thickness of the shutter assembly.

Accordingly, the disclosed system and method are directed towards overcoming one or more of the problems set forth above.

BRIEF SUMMARY OF THE INVENTION

In an exemplary embodiment of the present disclosure, a shutter includes at least one shutter blade, a magnet movably connected to the at least one shutter blade, and a solenoid defining a gap between a first pole and a second pole. The solenoid is configured to controllably draw the magnet into the gap in a first state and to controllably repel the magnet from the gap in a second state.

In another exemplary embodiment of the present disclosure, a shutter includes a plurality of shutter blades moveable between an open position and a closed position, a magnet movably connected to each shutter blade of the plurality of shutter blades, and a solenoid having a first face defining a first pole, and a second face facing the first face and defining a second pole. The first and second faces lie in a plane substantially parallel to the plurality of shutter blades and the solenoid defines a central axis perpendicular to the plane. The magnet is configured to move in a path coplanar with the solenoid and substantially perpendicular to the central axis in response to a polarity of at least one of the first and second poles.

In a further exemplary embodiment of the present disclosure, a method of controlling a shutter includes drawing a portion of a magnet into a gap defined by first and second poles of a solenoid. Drawing the portion of the magnet into the gap causes a plurality of shutter blades movably connected to the magnet to move to an open position. The method also includes repelling the portion of the magnet from the gap. Repelling the portion of the magnet from the gap causes the plurality of shutter blades to move to a closed position.

In a further exemplary embodiment of the present disclosure, a shutter assembly includes a drive ring having a permanent magnet disposed thereon and a solenoid defining a gap between first and second magnetic poles thereof. In such an exemplary embodiment, the drive ring is disposed coplanar with the solenoid and is rotatable in response to a magnetic field created between the first and second magnetic poles. In such an exemplary embodiment, the shutter assembly also includes a plurality of shutter blades configured to transition between an open position and a closed position in response to rotation of the drive ring, and a base plate separating the plurality of shutter blades from at least one of the drive ring and the solenoid.

In yet another exemplary embodiment of the present disclosure, a method of controlling a plurality of shutter blades includes providing a shutter assembly including a drive ring having a permanent magnet disposed thereon, and a solenoid defining a gap between first and second magnetic poles thereof. The drive ring is disposed coplanar with the solenoid and is rotatable in response to a magnetic field created between the first and second magnetic poles. The shutter assembly also includes a plurality of shutter blades configured to transition between an open position and a closed position in response to rotation of the drive ring. The shutter assembly further includes a base plate separating the plurality of shutter blades from at least one of the drive ring and the solenoid. In such an exemplary embodiment, the method of controlling a plurality of shutter blades further includes transitioning the plurality of shutter blades between the open and closed positions and reducing an electrical signal applied to the solenoid while the plurality of shutter blades is in transit between the open and closed positions.

In still another exemplary embodiment of the present disclosure, a shutter assembly includes a solenoid, a drive ring disposed coplanar with the solenoid and configured to rotate in response to activation of the solenoid, and a plurality of shutter blades configured to transition between an open position and a closed position in response to rotation of the drive ring.

BRIEF DESCRIPTION OF THE SEVERAL VIEWS OF THE DRAWINGS

FIG. 4 is a plan view of a shutter, with portions removed, according to still another exemplary embodiment of the present disclosure.

FIG. 5 is a cross-sectional view of the shutter of FIG. 4, as seen from section line 5-5 in FIG. 4.

FIG. 6 shows a portion of the shutter illustrated in FIG. 4 with portions removed.

FIG. 7 is an additional view of the shutter illustrated in FIG. 4.

FIG. 8 is a cross-sectional view of the shutter illustrated in FIG. 7.

FIG. 9 shows a portion of the shutter illustrated in FIG. 7 with portions removed.

FIG. 10 is a cross-sectional view of a shutter according to another exemplary embodiment of the present disclosure.

FIG. 11 is shows a portion of the shutter illustrated in FIG. 10 with portions removed.

DETAILED DESCRIPTION OF THE INVENTION

Figure 1:
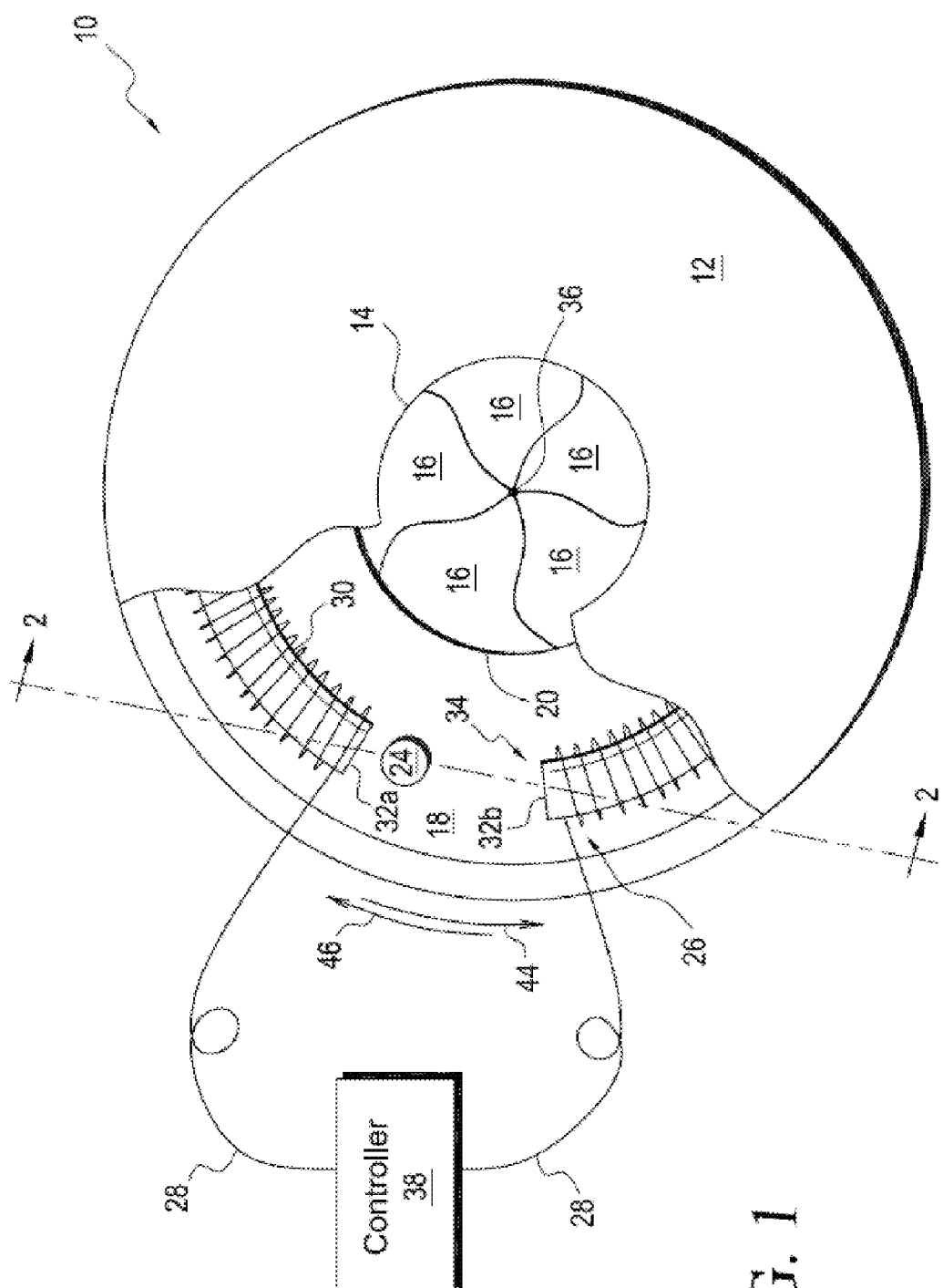
FIG. 1 is a plan view of a shutter, with portions removed, according to an exemplary embodiment of the present disclosure with portions removed.

FIG. 1 shows a shutter 10 according to an exemplary embodiment of the present disclosure. The shutter 10 is a type that can be used in any photographic, scientific or calibration application that requires one or more cycles of opening and closing of a shutter opening by driving one or more shutter blades across an opening.

The shutter 10 includes a base plate 12 defining a shutter opening 14. In an exemplary embodiment, the shutter opening 14 is a circular aperture having a central axis 36. Light is selectively occluded from passing through and is allowed to pass through the shutter opening 14 by moving a plurality of shutter blades 16 (usually five) in a pivoting action across the shutter opening 14. The shutter blades 16 preferably all move in a single shutter plane, which is normal to the central axis 36 of the shutter opening 14. In prior art shutters, the shutter blades are operated by a linear motor mounted to the base plate. The motor acts through a mechanical linkage to rotate a driver plate or drive ring, wherein the rotation of the driver plate in a to-and-fro motion acts to move the shutter blades to selectively reveal and cover the shutter opening.

An exemplary shutter 10 of the present disclosure also uses a drive ring 18 such as those conventionally used. A portion of the drive ring 18 is seen in FIG. 1 through the removed portion of the base plate 12. The drive ring 18 has an opening 20 that aligns with the shutter opening 14 so as not to impinge on the shutter opening. Extending from the drive ring are pins (not shown) that extend into a corresponding cam slot (not shown) formed in each of the shutter blades 16. With this arrangement, the rotation of the drive ring 18 to and fro about a drive ring rotational axis that is co-linear with the central axis 36 of the lens opening 14 will cause the shutter blades 16 to pivot between open and closed positions. The closed position is shown in FIG. 1.

As also shown in FIG. 1, the shutter 10 includes a permanent magnet 24 in communication with the drive ring 18, and a solenoid 26 arranged proximate the permanent magnet 24. The permanent magnet 24 and the solenoid 26 preferably cooperate to actuate the drive ring 18 about the drive ring rotational axis discussed above.

The solenoid 26 generally is made up of a wire 28 wound about a core 30. In the exemplary embodiment illustrated in FIG. 1, the solenoid 26 is generally arcuate and has an inner diameter larger than the diameter of the shutter opening. Accordingly, the solenoid 26 can be disposed in the shutter 10 about the shutter opening 14 without interfering with the shutter opening 14. In an exemplary embodiment of the present disclosure, the solenoid 26 can be substantially C-shaped and may span more than about 270-degrees of rotation about the central axis 36. The substantial C-shape terminates at operative faces 32a, 32b. The operative faces 32a, 32b are spaced by a gap 34 because the solenoid 26 does not form a complete circle around the shutter opening 36. At least a portion of the permanent magnet 24 preferably is disposed in the gap 34 between the first and second operative faces 32a, 32b. Ends of the wire 28 forming the solenoid 26 are disposed as leads proximate the first and second operative faces 32a, 32b, and the leads are connected to a solenoid driver 38. When the driver 38 applies a current to the solenoid 26 via the wire 28, the operative faces 32a, 32b become oppositely polarized. More specifically, when a first current is applied to the solenoid 26, the first operative face 32a takes on a first polarity, i.e., a north or south polarity, and the second operative face 32b takes on an opposite polarity.

Figure 2:
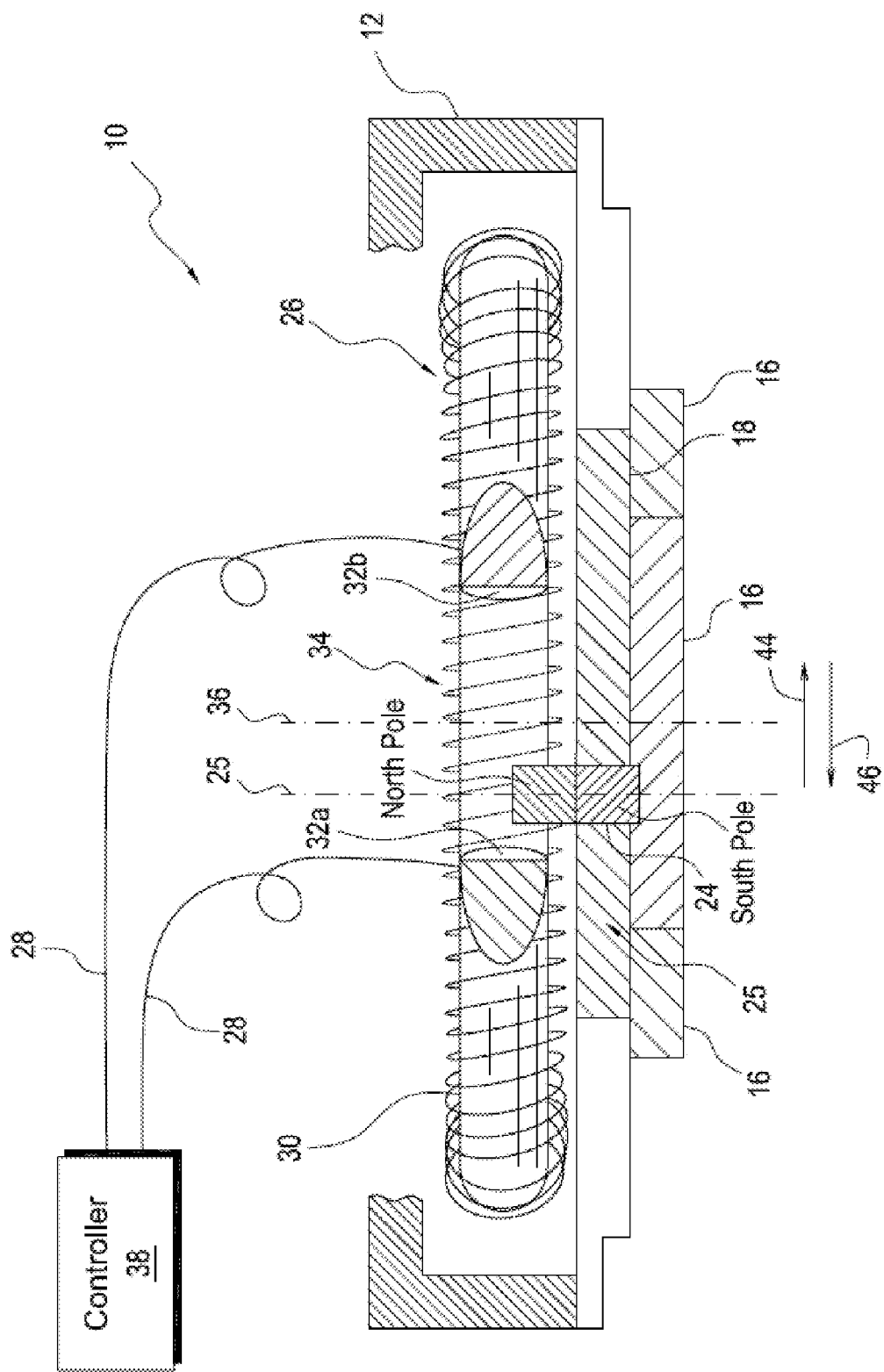
FIG. 2 is a cross-sectional view of the shutter of FIG. 1, as seen from section line 2-2 in FIG. 1.

The permanent magnet 24 preferably is mounted to the drive ring 18, and at least a portion of the magnet 24 preferably is disposed in the gap 34 formed between the first and second operative faces 32a, 32b of the solenoid 26. As illustrated in FIG. 2, the permanent magnet 24 is arranged with its polar axis 25, i.e., the axis through both the first and second poles of the permanent magnet 24, substantially parallel to the central axis 36. In the illustrated exemplary embodiment, the north pole of the magnet 24 is arranged above the south pole, and the north pole is disposed in the gap 34 between the first and second operative faces 32a, 32b of the solenoid 26. The south pole may be disposed away from the gap 34, below the solenoid 26.

In operation and with the shutter 10 in a closed position as shown in FIGS. 1 and 2, the magnet 24 may be attracted to and may be generally aligned adjacent the first operative face 32a. When a first current is applied to the solenoid 26, a north pole is created at the first operative face 32a of the solenoid 26 and a south pole is created at the second operative face 32b. Because the north pole of the permanent magnet 24 is disposed between the operative faces 32a, 32b of the solenoid 26, the magnet 24 will be repelled by the first operative face 32a, and will be attracted by the second operative face 32b, thereby moving from a position proximate the first operative face 32a to a position proximate the second operative face 32b. Such movement is illustrated by arrow 44. Because the permanent magnet 24 is connected to the drive ring 18, movement of the magnet 24 drives the drive ring 18 about the drive ring rotation axis to open the shutter blades 16. Once the shutter blades 16 open, light is permitted to pass through the shutter opening 14.

De-energizing the solenoid 26 will allow the shutter blades 16 to remain in an open position until the current applied to the solenoid 26 is reversed because the permanent magnet 24 will continue to be attracted to the second operative face 32b. Accordingly, to close the shutter blades 16, and thereby occlude light through the shutter opening 14, the driver 38 can be operated to reverse the polarity of the solenoid 26. Reversing the polarity may form a north pole at the second operative face 32b, thereby repelling the permanent magnet 24 away from the second operative face 32b. Reversing the polarity may also form a south pole at the first operative face 32a and may attract the permanent magnet 24 thereto. Movement of the magnet from the second operative face 32b to the first operative face 32a is illustrated by arrow 46.

As should be understood, delaying the reversal of the current will allow the shutter 10 to remain in the open position for the time of the delay. Conversely, reversing the current soon after opening will cause the shutter 10 to open and close quickly.

In an exemplary embodiment to the present disclosure, the motion of the drive ring 18 may be stopped when the permanent magnet 24 contacts one of the first and second operative faces 32a, 32b of the solenoid 26. Appropriate sizing of the gap 34 and of the permanent magnet 24 will ensure that contact prevents over-rotation of the drive ring 18 past the fully-closed or the fully-open positions of the shutter blades 16. Alternatively, the shutter 10 may include other mechanical stops or abutting surfaces that stop rotation of the drive ring 18.

The shutter 10 may also include a damper to avoid slamming of components into each other. For example, when the permanent magnet 24 is to be moved between the open and closed positions, the movement of the permanent magnet 24 could be slowed by alternating the current applied to the solenoid 26, for example, to alternately attract and repel the permanent magnet 24 as it approaches one of the operative faces 32a, 32b. For example, as the magnet 24 is about to contact one of the operative faces 32a, 32b, a pulse could be applied to the solenoid 26 to repel the permanent magnet 24 to slow the movement of the permanent magnet 24, thereby acting on the permanent magnet 24 as a magnetic brake.

As discussed above, the shutter 10 may be configured such that the north pole of the magnet 24 is disposed in the gap 34. In an additional exemplary embodiment of the present disclosure, however, the magnet 24 could be inverted such that the south pole of the magnet 24 is disposed in the gap 34 and the north pole of the magnet 24 is spaced either above or below the gap 34. In such an exemplary embodiment, however, because the operative faces 32a, 32b of the solenoid 26 may be controlled to have opposite polarities, only one pole of the magnet 24 may be disposed in the gap 34 between the operative faces 32a, 32b of the solenoid 26 so that each operative face 32a, 32b "sees" the same polarity of the magnet 24. In addition, in each of the embodiments discussed above, the solenoid 26 may be disposed on a first surface of the drive ring 18, and the shutter blades 16 may be disposed on a second, oppositely-facing, surface of the drive ring 18. The permanent magnet 24 may be mounted to protrude from the first surface of the drive ring 18.

Figure 3:
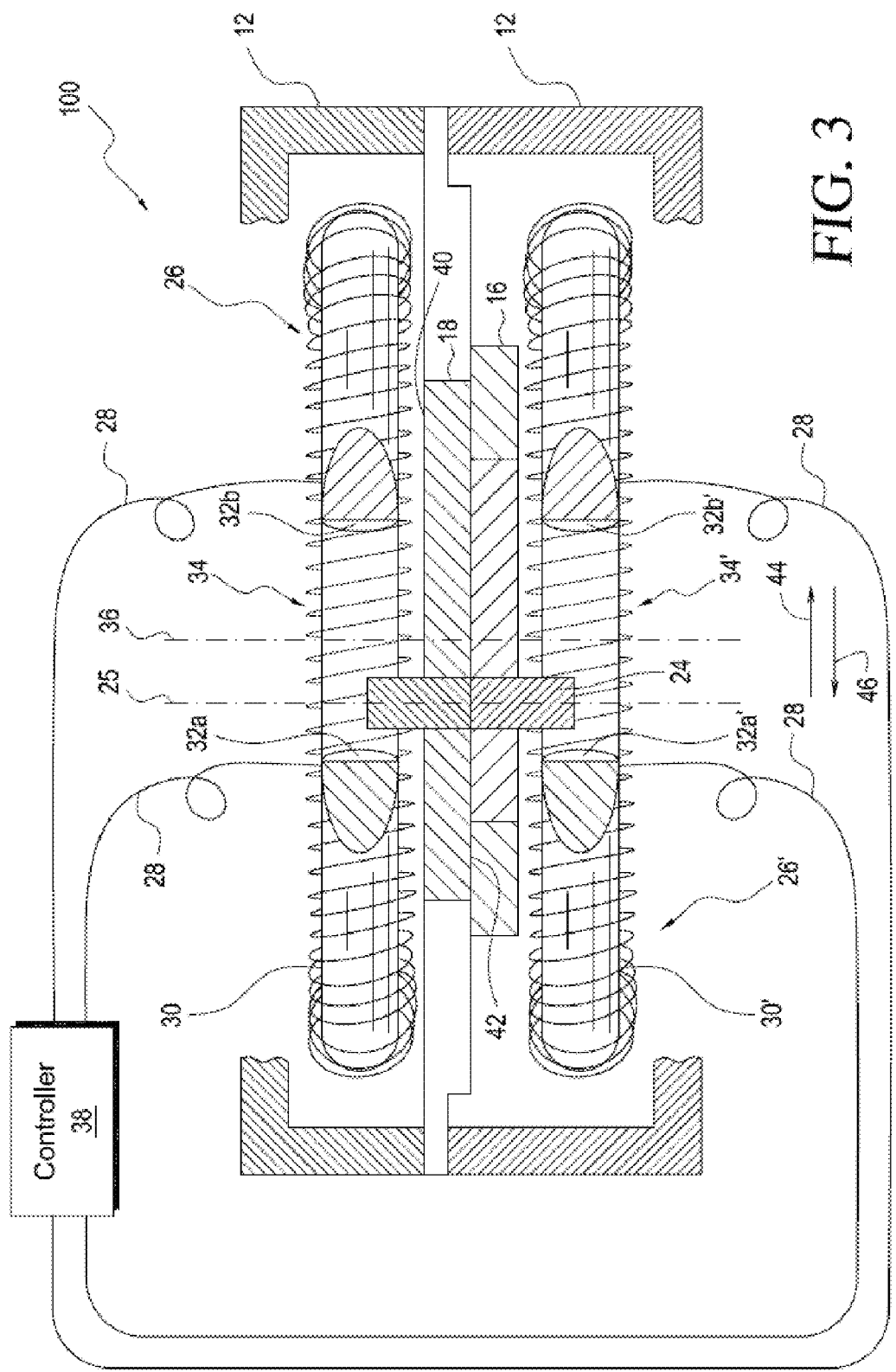
FIG. 3 is a cross-sectional view of a shutter, with portions removed, according to another exemplary embodiment of the present disclosure.

FIG. 3 illustrates an additional exemplary embodiment of the present disclosure. In this embodiment, two solenoids 26, 26' are provided in a shutter 100. The second solenoid 26' is substantially identical to the first solenoid 26, described above, and the two solenoids 26, 26' may be disposed proximate first 40 and second 42 oppositely-facing surfaces of the drive ring 18, respectively. Also in this embodiment, the permanent magnet 24 may be disposed through the drive ring 18, such that a first end of the magnet 24 is disposed in the gap 34 between operative faces 32a, 32b of the first solenoid 26 and a second end of the magnet 24 is disposed in the gap 34' between operative faces 32a', 32b' of the second solenoid 26'. The shutter 100 illustrated in FIG. 3 may function substantially similarly to the shutter 10 illustrated in FIGS. 1 and 2, and the presence of the second solenoid 26' may assist in providing additional force for the actuation of the permanent magnet 24. As a result, the exemplary embodiment illustrated in FIG. 3 may be utilized in applications in which the shutter component being actuated by the permanent magnet 24 requires a greater amount of force to move. Such embodiments may include those in which a large number of shutter blade 16 are used.

FIG. 4 illustrates a shutter 200 according to yet another exemplary embodiment of the present disclosure. Where possible, like reference numbers have been used to describe the components of the shutter 200. Although not shown in FIG. 4, it is understood that the shutter 200 may also include a cover mounted to the base plate 12.

As shown in FIGS. 4 through 11, the shutter 200 can include a plurality of shutter blades 16 pivotally mounted and/or otherwise connected to a base plate 12. The shutter 200 can also include a magnet 50 such as, for example, a permanent magnet that is movably and/or otherwise connected to at least one of the shutter blades 16. The shutter 200 can also include a solenoid 26 defining a gap 34 between a first pole and a second pole. As will be described below, the solenoid 26 may be configured to controllably draw the magnet 50 into the gap 34 in a first state and to controllably repel the magnet 50 from the gap 34 in a second state. Such states may be defined by the respective polarities of poles defined by the solenoid 26. The solenoid 26 may also be configured so as to extend along and/or otherwise lie in a plane 62 substantially parallel to the plurality of shutter blades 16. The solenoid 26 may, thus, define a central axis 60 that is perpendicular to the plane 62.

The plurality of shutter blades 16 may be made from, for example, hardened aluminum, cold-rolled steel, stainless steel, titanium, and/or any other metal or alloy commonly used in shutters for photographic, scientific, or calibration applications. The shutter 200 may include any desirable number of shutter blades 16 known in the art. For example, although FIGS. 4 through 11 illustrate only two shutter blades 16, it is understood that the shutter 200 can include at least one shutter blade 16, or more than two shutter blades 16 depending upon the application in which the shutter 200 is being used. Accordingly, the shutter blades 16 can have any shape, size, and/or other configuration known in the art. The shutter blades 16 can be, for example half-moon shaped, teardrop shaped, substantially triangular, substantially square, substantially rectangular, and/or any other shape known in the art. The shutter blades 16 may preferably be as thin as possible so as to reduce a profile of the shutter 200. The shutter blades 16 may be pivotally, rotatably, and/or otherwise movably connected to the base plate 12 in anyway known in the art. For example, the shutter 200 may include a pin 52 fixedly attached to base plate 12, and each of the shutter blades 16 may be configured to rotate about the pin 52 between an open position (shown in FIG. 4) and a closed position (shown in FIG. 7). When in the open position, the shutter blades 16 may permit light to pass through the shutter opening 14 defined by the base plate 12. Likewise, when in the closed position, the shutter blades 16 may occlude light from passing through the shutter opening 14. It is understood that the shutter 200 may include additional pins 52, and each of the shutter blades 16 may be pivotally connected to at least one pin 52.

The base plate 12 of the shutter 200 may be substantially disc-shaped, substantially square, substantially rectangular, and/or any other shape known in the art. The base plate 12 may define one or more channels within which components of the shutter 200 may be disposed. For example, one or more channels of the base plate 12 may support, accept, and/or otherwise house the solenoid 26 and/or the magnet 50. The base plate 12 may be made from any metals, plastics, alloys, polymers, and/or other materials known in the art, and at least a portion of the base plate 12 may be made from a substantially non-magnetic metal or alloy. As discussed above with respect to the shutter blades 16, it may be desirable for the base plate 12 to be as thin as possible to as to minimize the overall dimensions of the shutter 200.

As shown in FIGS. 4 through 11, the magnet 50 may be movably connected to each shutter blade 16 of the plurality of shutter blades and may be movable within, for example, a channel defined by the base plate 12. As discussed above, the magnet 50 may be any type of magnet known in the art such as, for example, a permanent magnet having a north pole and a south pole. The magnet 50 may have any shape, size, and/or other configuration known in the art. For example, the magnet 50 may be sized and/or shaped to facilitate rapid movement of the shutter blades 16. As shown in at least FIGS. 5, 6, 8, and 9, the magnet 50 may define at least one knob 66 movably disposed within each slot 54 of the shutter blades 16. In an exemplary embodiment, the knob 66 may protrude from a top portion of the magnet 50 and the knob 66 may be substantially cylindrical in shape so as to reduce the friction created by movement of the knob 66 within the slots 54. As shown in FIGS. 10 and 11, in another exemplary embodiment, the knob 66 may be omitted and the magnet 50 itself may be substantially cylindrical. In such an embodiment, the magnet 50 may define a portion movably disposed within each slot 54, and the slots 54 may be sized and/or otherwise configured to move relative to the rounded portion of the magnet 50 disposed therein.

It is understood that the slots 54 may be shaped, sized, and/or otherwise configured to accept movement of any portion of the magnet 50 disposed therein. Accordingly, movement of a portion of the magnet 50, such as the knob 66, within the slots 54, may assist in transitioning the shutter blades 16 between the open position (FIG. 4) and the closed position (FIG. 7).

As shown in at least FIGS. 6, 9, and 11, the magnet 50 may include a flat surface defining a north pole N and another flat surface defining a south pole S. The flat surfaces defining the poles N, S of the magnet 50 may be disposed adjacent to the operative faces 32a, 32b of the solenoid 26. The magnet 50 may also define a center line 70 passing through the midpoint and/or magnetic center of the north and south poles N, S. In an exemplary embodiment, the center line 70 may be substantially perpendicular to the flat surfaces of the magnet 50 defining the north pole N and the south pole S. In the embodiment shown in FIGS. 10 and 11, the slots 54 (not shown) may fit over the flat surfaces of the magnet 50 such that only the rounded portion of the magnet 50 contacts the shutter blades 16 to assist in the transition between the open and closed positions.

The magnet 50 may be configured to move in the direction of arrow 56 (FIGS. 4-6) to transition the shutter blades 16 into the open position, and the magnet 50 may be configured to move in the direction of arrow 58 (FIGS. 7-9) to transition the shutter blades 16 into the closed position. The shutter 200 may also include one or more stops 64, 65 configured to limit and/or restrict the movement of the magnet 50 in the direction of arrow 56 and arrow 58. The stops 64, 65 may be fixedly disposed within the base plate 12 and may be any structure known in the art configured to limit and/or restrict the movement of a movable structure disposed proximate thereto. The stops 64, 65 may be made from any dampening material known in the art such as, for example, rubber, plastics, and/or polymers. The stops 64, 65 may be non-brittle and may be configured to tolerate repeated impacts with one or more moving parts such as, for example, the magnet 50 of the shutter 200. In an exemplary embodiment, the stops 64, 65 may comprise one or more dampers configured to limit and/or otherwise restrict the travel of the magnet 50 relative to the gap 34. In such an exemplary embodiment, the stops 64, 65 may soften the impact of the magnet 50 as it transitions the shutter blades 16 between the open position and the closed position. The stops 64, 65 may have any shape, size, and/or other configuration known in the art configured to assist in dampening the impact of the magnet 50. For example, the stops 64, 65 may comprise one or more nylon set screws configured to dampen the magnet 50 upon impact therewith.

In an exemplary embodiment, the stops 64, 65 may be positioned within the base plate 12 so as to prohibit the north pole N and south pole S of the magnet 50 from moving into a position aligned with, for example, magnetic poles defined by the first and second operative faces 32a, 32b of the solenoid 26, respectively. In such an exemplary embodiment, the solenoid 26 and/or the core 30 may define a center line 68 passing through the magnetic center of the poles defined by the first and second operative faces 32a, 32b. The first and second operative faces 32a, 32b may have opposite polarities and the polarities of these poles may be controlled by the driver 38 (FIGS. 1-3). Accordingly, in such an exemplary embodiment, the stop 65 may be positioned to prohibit the magnetic poles N, S of the magnet 50 from moving into alignment with the magnetic poles defined by the operative faces 32a, 32b of the solenoid 26. In particular, as shown in FIGS. 6 and 11, the stop 65 may prohibit the center line 70 of the poles N, S of the magnet 50 from aligning with the center line 68 of the poles defined by the operative faces 32a, 32b, respectively. Thus, when the shutter blades 16 are in the open position, the permanent magnet 50 may be prohibited from fully entering the gap 34 and the magnetic center line 70 of the poles N, S of the magnet 50 may be prohibited from completely aligning with the magnet center line 68 of the poles defined by the operative faces 32a, 32b of the solenoid 26.

In addition, when the shutter blades 16 are in the closed position, the center line 70 may be even further out of alignment with the center line 68 as shown in FIG. 9. In addition, the flat surface of the magnet 50 defining the south pole S may be a distance $d_1$ from the operative face 32b of the solenoid 26, and the flat surface defining the north pole N of the magnet 50 may be a distance $d_2$ from the operative face 32a. As shown in FIG. 9, in an exemplary embodiment the distance $d_1$ may be substantially equivalent to the distance $d_2$ and the magnet 50 may remain substantially equidistant from the first and second operative faces 32a, 32b while the magnet 50 moves in the direction of arrows 56, 58.

The solenoid 26 may be substantially similar to the solenoid 26 discussed above with respect to FIGS. 1 through 3. In an exemplary embodiment, the solenoid 26 may have any shape, size, and/or other configuration known in the art. For example, the solenoid 26 may be substantially square, substantially rectangular, substantially C-shaped, and/or any other configuration capable of controllably delivering an electromagnetic charge. For example, as shown in FIGS. 4 through 11, the solenoid 26 may comprise a C-shaped core 30 defining a gap 34 between the first operative face 32a and the second operative face 32b. In addition, the first operative face 32a may face the second operative face 32b, and in such an embodiment, the electromagnetic flux lines of the solenoid 26 may travel substantially directly between the poles defined by the operative faces 32a, 32b.

As shown in FIGS. 1 through 3, the solenoid 26 may further comprise a coil of wire 28 wound around the core 30 and the wire 28 may be electrically connected to the driver 38. For ease of illustration, the coil of wire 28 and the driver 38 have been omitted from FIGS. 4 through 11. Although not illustrated in FIGS. 4 through 11, it is understood that the number of turns and/or the length of the wire 28 may define the electromagnetic strength of the poles defined by the operative faces 32a, 32b of the solenoid 26, and the greater the number of turns (i.e., the greater the length) of the coil 28, the more powerful the solenoid 26.

With such a coil configuration, the solenoid 26 may be operable using a much lower voltage than conventional electromagnets. In an exemplary embodiment, the solenoid 26 may provide a relatively large magnetic flux between the poles defined by the operative faces 32a, 32b with a relatively low voltage being supplied thereto. For example, the solenoid 26 may be operable utilizing less than 5 volts of electrical power and, in exemplary embodiments, the solenoid 26 may be operable utilizing less than 3 volts. Reducing and/or substantially minimizing the size of the gap 34 may assist in increasing the power of the solenoid 26. Thus, the distances $d_2$, $d_1$ between the poles N, S of the magnet 50 and the poles defined by the operative faces 32a, 32b of the solenoid 26 may be desirably as small as possible. In an exemplary embodiment, the distances $d_1$, $d_2$ may be equal to, approximately, 0.125" or less.

As discussed above, the magnet 50 may remain substantially equidistant from the first and second poles of the solenoid 26 as the magnet 50 is drawn into and repelled from the gap 34. The polarity of each pole of the solenoid 26 may be controllably reversed by the driver 38 to controllably draw the magnet 50 into the gap 34 in a first magnetic state and controllably repel the magnet 50 from the gap 34 in a second magnetic state. As shown in at least FIGS. 5, 8, and 10, the magnet 50 may be configured to travel along a substantially linear path, and the path of the magnet 50 may be substantially coplanar with the solenoid 26. The linear path of the magnet 50 may also be substantially perpendicular to a line, such as, for example, the centerline 68, connecting the poles defined by the operative faces 32a, 32b of the solenoid 26.

The central axis 60 of the solenoid 26 may be substantially parallel to the central axis 36 of the shutter opening 14 and, in an exemplary embodiment, the central axis 60 may be co-linear with the central axis 36. Thus, as shown in FIGS. 5, 6, 10, and 11, the solenoid 26 may be configured to draw the magnet 50 into the gap 34 along the plane 62 in a direction perpendicular to the central axis 60 of the solenoid 26. Likewise, as shown in FIGS. 8 and 9, the solenoid 26 may be configured to repel the magnet 50 from the gap 34 along the plane 62 and perpendicular to the central axis 60.

In such an exemplary embodiment, the magnet 50 may travel along a linear path between the stops 64, 65, and this linear path may be substantially coplanar with the plane 62. Although not explicitly illustrated in FIGS. 4 through 11, it is understood that this linear path may be substantially defined by a channel and/or other structures or components of the base plate 12. For example, the stops 64, 65 may define at least a portion of the path. It is understood that the path traveled by the magnet 50 may extend transverse to the gap 34 defined by the solenoid 26. As will be described in greater detail below, the magnet 50 may be configured to move in the path in response to the polarities of the poles defined by the first and second operative faces 32a, 32b.

In an additional exemplary embodiment of the present disclosure, the shutter 200 may include one or more feedback sensors configured to assist in controlling the position of the magnet 50. The sensors 72, 74 (FIGS. 5, 8, and 10) may comprise any type of electromagnetic and/or position sensor known in the art. For example, the sensors 72, 74 may comprise a Hall effect sensor and a portion of the Hall effect sensor may be mounted proximate the magnet 50. Exemplary mounting locations may include positions above or below one or both of the stops 64, 65. Alternatively, the sensors 72, 74 may comprise a current sensor configured to sense the current traveling through the coil 28 of the solenoid 26. In the exemplary embodiments discussed above, the driver 38 may receive feedback signals produced by the one or more sensors 72, 74. The signals may be indicative of a change in current travelling through the solenoid 26 as a result of the position of the magnet 50 within the gap 34. The driver 38 may then alter the current directed to the solenoid 26 to control the position of the magnet 50 within and/or otherwise relative to the gap 34.

In still another embodiment, the sensors 72, 74 may comprise a micromagnet mounted to one or more of the shutter blades 16 and a corresponding transponder mounted to a stationary component of the shutter 200 to detect the relative position of the micromagnet. In still a further embodiment, the sensors 72, 74 may comprise a flag or other structure mounted to the magnet 50 and a corresponding sensor configured to detect the position of the flag. In such exemplary embodiments, the driver 38 may receive feedback from the one or more sensors 72, 74 based on the change in position of the sensor components. In each of the embodiments discussed above, the feedback received from the sensors 72, 74 may be utilized to detect and/or otherwise assist in controlling the position of the magnet 50, thereby controlling the position of the shutter blades 16.

FIGS. 12-18 illustrate a shutter assembly 300 according to an additional exemplary embodiment of the present disclosure. Wherever possible, components of the shutter assembly 300 that are substantially the same as those described above with respect to, for example, FIGS. 4-11, will be described below using like reference numerals.

The shutter assembly 300 may include, for example, a plurality of shutter blades 16 pivotally mounted and/or otherwise connected to a base plate 12. The shutter assembly 300 may also include a drive ring 18 that is movably connected to the shutter blades 16 and configured to rotate with respect to the base plate 12, for example, about a central axis 36 (FIG. 17) of the shutter assembly 300. The drive ring 18 may include a permanent magnet 50 connected thereto. In an exemplary embodiment, the permanent magnet 50 may be connected to a perimeter of the drive ring 18. The shutter assembly 300 may also include a solenoid 26 defining a gap 34 between a first magnetic pole and a second magnetic pole as shown in, for example, FIG. 16. Such first and second magnetic poles may be disposed on a first face 32a and a second face 32b of the solenoid 26, respectively. As will be described in greater detail below, the solenoid 26 may be configured to produce a variable and/or otherwise controllable magnetic field between the first and second magnetic poles and/or proximate the gap 34. Accordingly, the solenoid 26 may be configured to control motion and/or movement of the drive ring 18 and the magnet 50 connected thereto. In particular, the solenoid 26 may be controlled to desirably position the magnet 50 relative to the gap 34. The solenoid 26 may also be controlled to magnetically accelerate and/or magnetically decelerate movement of the magnet 50, and/or the drive ring 18, while transitioning the plurality of shutter blade 16 between an open position, illustrated in FIG. 13, and a closed position, illustrated in FIG. 16.

Figure 17:
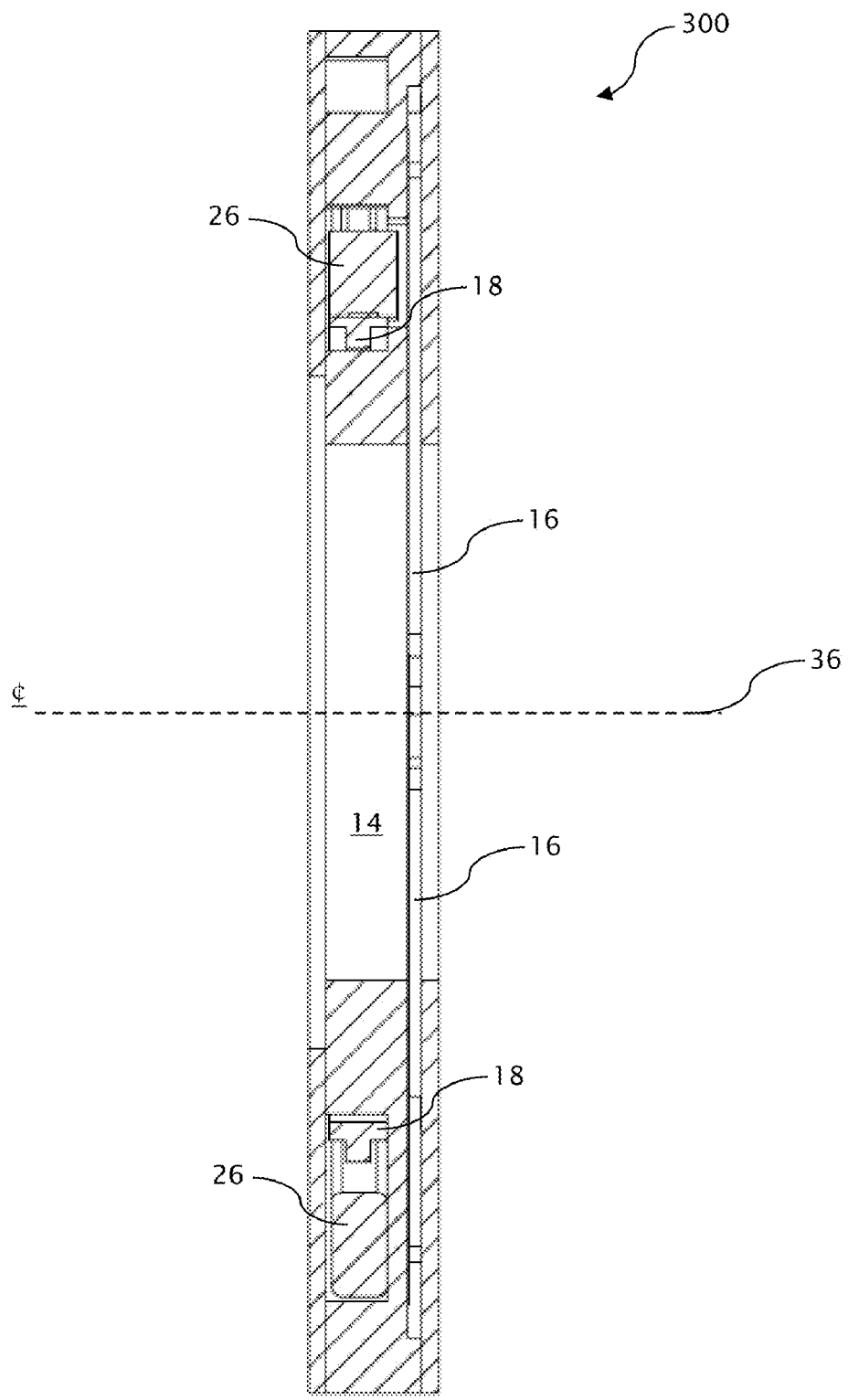
FIG. 17 is a cross-sectional view of the shutter assembly shown in FIG. 12.

In an exemplary embodiment, the solenoid 26 may be disposed on a first side 84 of the base plate 12. As discussed above with respect to FIGS. 4-11, the solenoid 26 may comprise a wire 28 wound about a core 30. As shown in at least, for example, FIGS. 12, 14, and 18, the solenoid 26 may take the shape of the core 30. Thus, in an exemplary embodiment, the solenoid 26 may be generally arcuate and may have an inner diameter larger than the diameter of the central opening 14 such that the solenoid 26 may be disposed substantially annularly around the central opening 14 and/or the central axis 36 (FIG. 17). The core 30, and thus the solenoid 26, may be, for example, substantially C-shaped and may terminate at the operative faces 32a, 32b.

Figure 18:
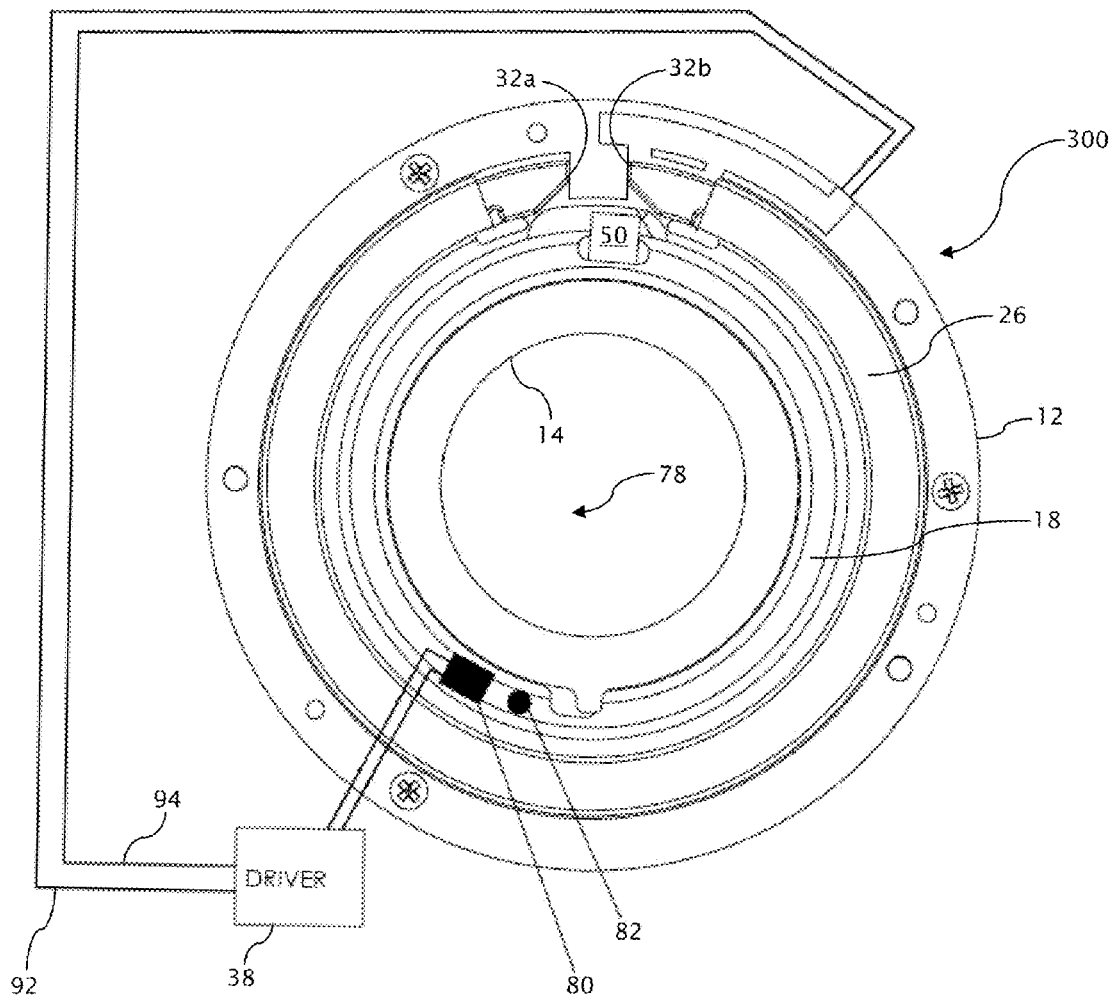
FIG. 18 is yet another view of the shutter assembly illustrated in FIG. 12 according to an additional exemplary embodiment of the present disclosure.

The faces 32a, 32b may form the first and second magnetic poles of the solenoid 26 and, in an exemplary embodiment, the poles of the solenoid 26 may be controlled to have opposite magnetic polarities. At least a portion of the permanent magnet 50 may be disposed within the gap 34 between the first and second faces 32a, 32b. As shown in FIG. 18, the wire wound about the solenoid core may form leads proximate the first and second faces 32a, 32b, and the leads may be connected to a solenoid driver 38 via wires 92, 94, respectively. When the driver 38 applies an electrical current to the solenoid 26 via the wires 92, 94, the faces 32a, 32b of the solenoid 26 may become oppositely polarized. In particular, when a first electrical current is applied to the solenoid 26, the first operative face 32a may take on a first polarity, i.e., a north or south polarity, and the second operative face 32b may take on an opposite polarity.

Figure 12:
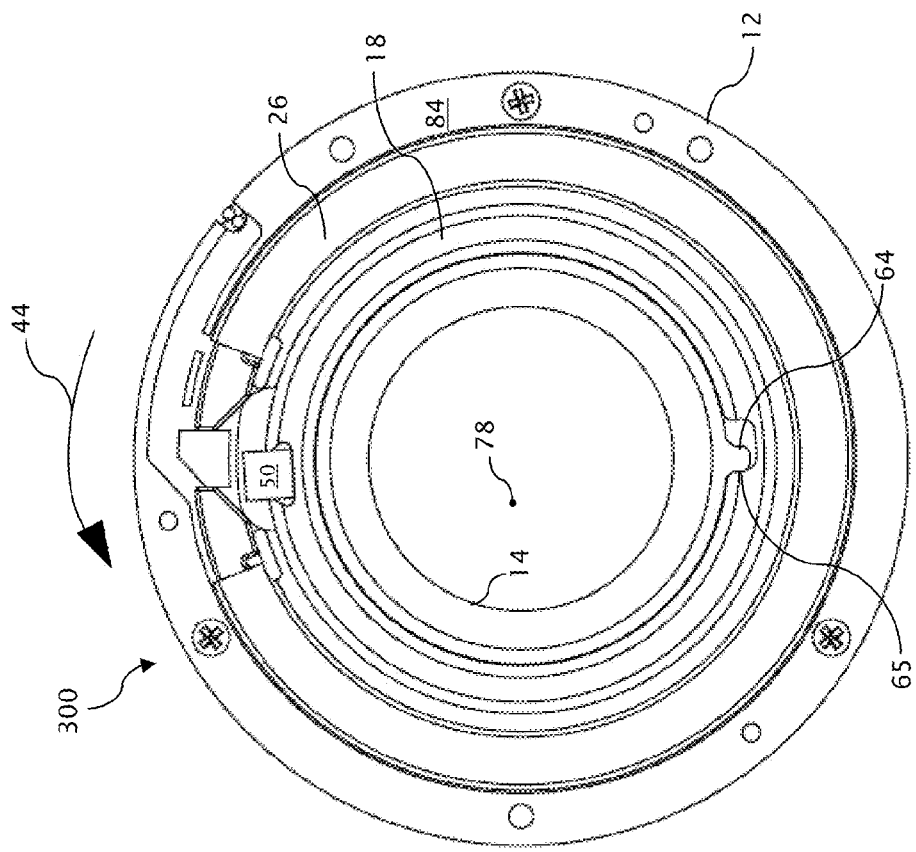
FIG. 12 is a plan view of a shutter assembly, with portions removed, according to another exemplary embodiment of the present disclosure.
Figure 15:
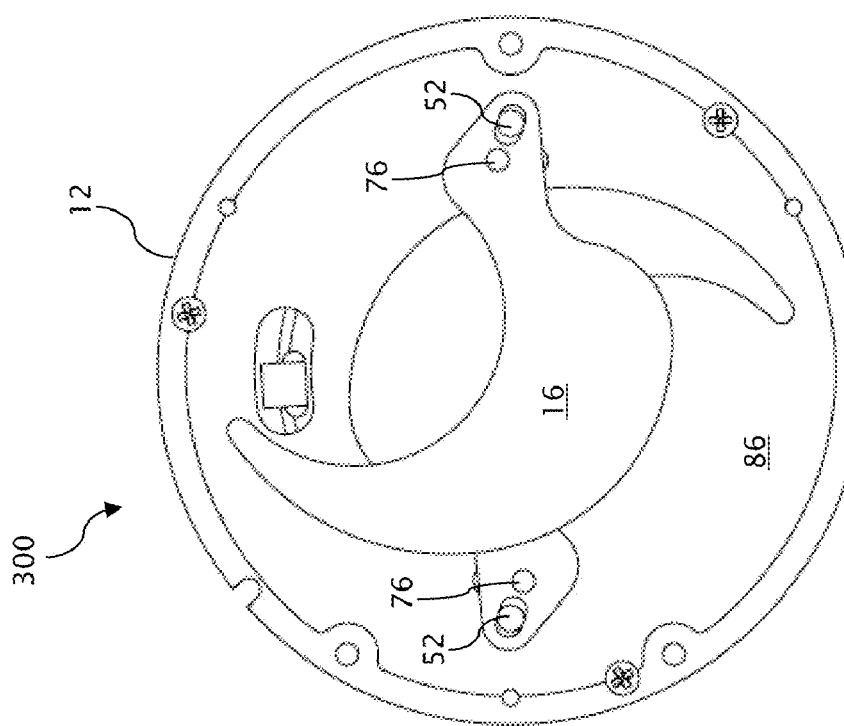
FIG. 15 is still another view of the shutter assembly illustrated in FIG. 12.

As described above with respect to FIGS. 4-11, the solenoid 26 may be controlled by the driver 38 to create a desirable magnetic field proximate the gap 34 and to thereby control movement of the permanent magnet 50. Movement of the magnet 50, and the corresponding movement of the drive ring 18, may assist in transitioning the plurality of shutter blades 16 between the open and closed positions. It is understood that with the magnet 50 and drive ring 18 in a first position, as illustrated in FIG. 12, wherein the magnet 50 is closer to the first face 32a, the shutter blades 16 may be in the open position shown in FIG. 13. Conversely, when the magnet 50 and the drive ring 18 are in a second position, defined by the magnet 50 being disposed closer to the second face 32b, the shutter blade 16 may be in the closed position as shown in FIG. 15. The solenoid 26 may be controlled to rotatably move the drive ring 18 about the central axis 36 of the shutter assembly 300 to obtain the first and second positions discussed above, as well as other intermediate positions. For example, the polarity of the faces 32a, 32b may be desirably reversed as the plurality of shutter blades 16 is transitioned between the open and closed positions. Movement of the drive ring 18 in response to a variable electrical current provided to the solenoid 26 and/or a variable electrical field created by the solenoid 26 will be described in greater detail below.

Figure 14:
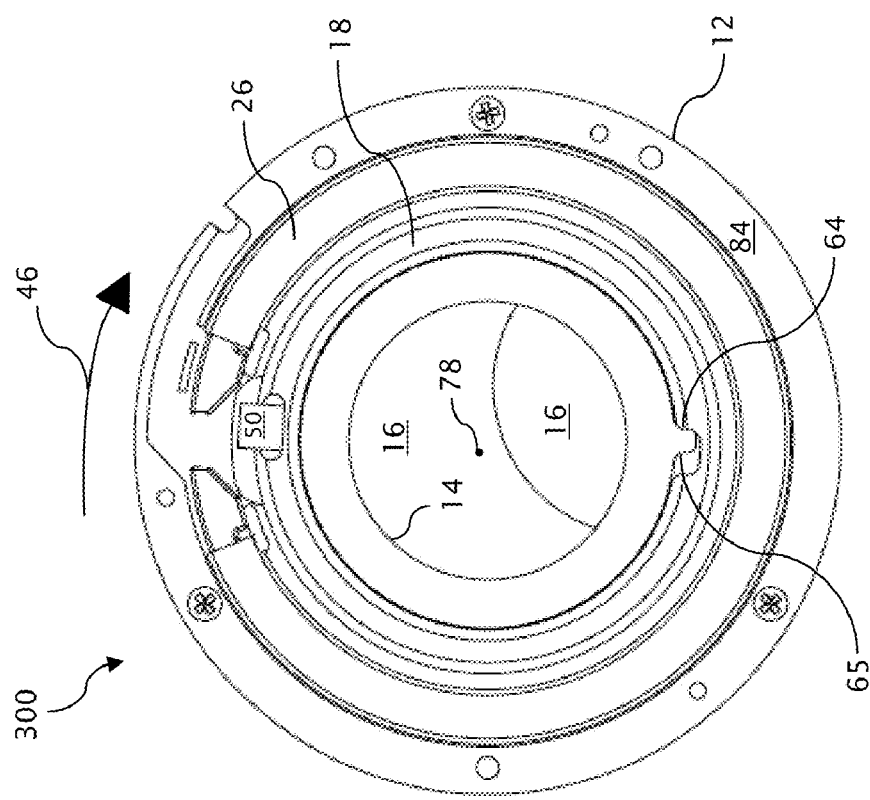
FIG. 14 is another view of the shutter assembly illustrated in FIG. 12.

The drive ring 18 may be rotatable relative to the base plate 12 in the direction of arrow 44 (FIG. 12) and arrow 46 (FIG. 14). In an exemplary embodiment, the drive ring 18 may be substantially annular and may be configured to rotate about the central axis 36. The drive ring 18 may be disposed on the first side 84 of the base plate 12 and, in an exemplary embodiment, the drive ring 18 may be disposed substantially coplanar with the solenoid 26. In addition, the drive ring 18 may be disposed substantially concentric with the solenoid 26 such that both the solenoid 26 and the drive ring 18 are centered about a center point 78 of the central opening 14. In exemplary embodiment, the central axis 36 may extend substantially perpendicular to the center point 78, and the central opening 14 may define a shutter opening of the shutter assembly 300. For example, the plurality of shutter blades 16 may expose the shutter opening while in the open position, thereby allowing light to pass through the central opening 14. Alternatively, in the closed position, the plurality of shutter blades may substantially occlude the shutter opening, thereby prohibiting light from passing through the central opening 14.

In an exemplary embodiment, the drive ring 18 may fit within a groove, slot, channel, and/or other portion of the base plate 12 to assist in guiding motion of the drive ring 18. In addition, the base plate 12 and/or other components of the shutter assembly 300 may act as a stop configured to limit, for example, rotational motion of the drive ring 18. In an exemplary embodiment, the base plate 12 may define stops 64, 65 configured to limit the extent to which the drive ring 18 may rotate about the central axis 36. In an exemplary embodiment, the stops 64, 65 may act on a portion of the drive ring 18 such as, for example, a notch or a cutout defined by a portion of the drive ring 18. Alternatively, the drive ring 18 may include one or more posts, extensions, and/or other structures (not shown) configured to interact with the stops 64, 65, thereby limiting the rotational motion of the drive ring 18. In an additional exemplary embodiment, at least one of the stops 64, 65 of the shutter assembly 300 may comprise a damper. Such dampers may include, for example, relatively soft movement impediments, and such impediments may be comprised of plastics, rubber, and/or other known dampening materials. Alternatively, as will be described below, the solenoid 26 may be configured to magnetically dampen motion of the drive ring 18 and, in such an exemplary embodiment, the stops 64, 65 may be omitted.

Figure 16:
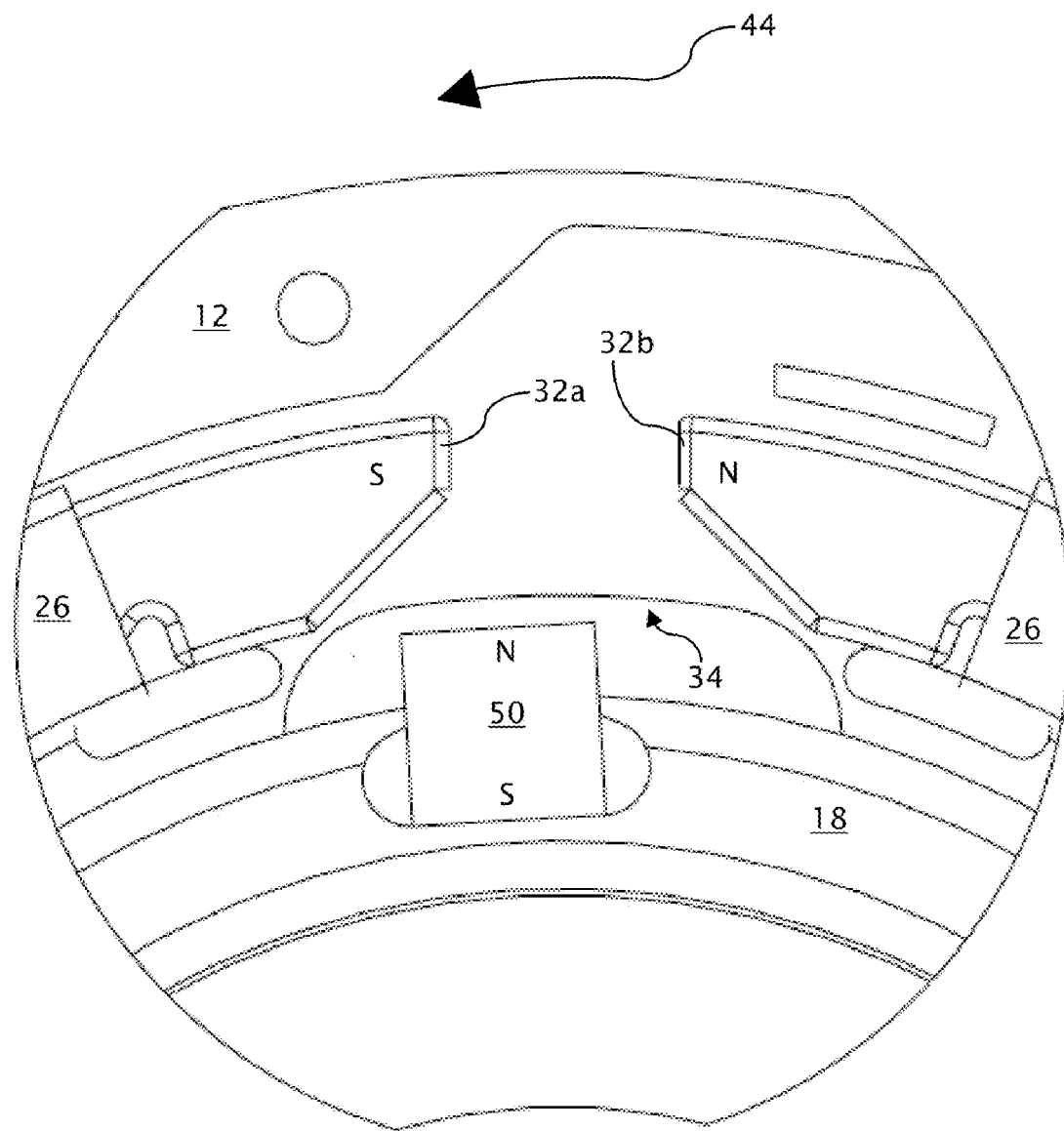
FIG. 16 illustrates a portion of the shutter assembly shown in FIG. 12, with portions removed.

The permanent magnet 50 may be disposed on the drive ring 18 and, in an exemplary embodiment, the magnet 50 may be connected to a perimeter of the drive ring 18. At least a portion of the magnet 50 may be disposed within the gap 34 formed between the first and second faces 32a, 32b of the solenoid 26. As shown in FIG. 16, a first pole of the permanent magnet 50 may be disposed within the gap 34 between the first and second faces 32a, 32b of the solenoid 26, and a second pole of the magnet 50 may be disposed away from the gap 34. For example, the north pole of the magnet 50 may be disposed within the gap 34 while the south pole of the magnet 50 may be disposed away from the gap 34, and it is understood that this configuration may be reversed if desired. However, the configuration illustrated in FIG. 16 will be described for the remainder of this disclosure for ease of description.

Figure 13:
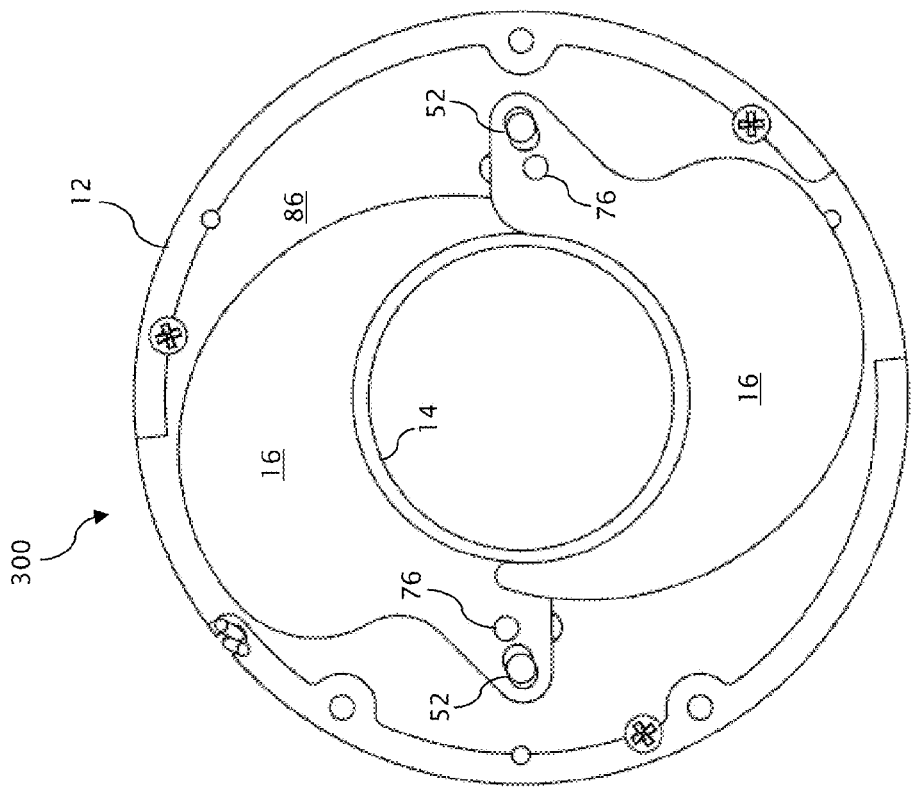
FIG. 13 is an additional view of the shutter assembly illustrated in FIG. 12.

As shown in FIG. 16, when a first current is applied to the solenoid 26, a south pole may be created at the first face 32a, and a north pole may be created at the second face 32b. Because the north pole of the permanent magnet 50 is disposed between the operative faces 32a, 32b of the solenoid 26, the magnet 50 will be attracted by the first operative face 32a and repelled by the second operative face 32b. Accordingly, in such an embodiment, the drive ring 18 will be moved in the direction of arrow 44 such that the permanent magnet 50 may be disposed proximate the first operative face 32a. Movement of the magnet 50 drives the drive ring 18 about the central axis 36 to open the shutter blades 16, as illustrated in FIG. 13. Conversely, when an opposite current is applied to the solenoid 26, the polarity of the faces 32a, 32b may be reversed. In particular, in such an embodiment, a north pole may be created at the first face 32a and a south pole may be created at the second face 32b, thereby forcing the magnet to move in the direction of arrow 46 (FIG. 14). Such movement will rotate the drive ring 18 about the central axis 36 to close the shutter blades 16 as illustrated in FIG. 15. As the permanent magnet 50 is disposed on the drive ring 18, the permanent magnet 50 may travel in an arcuate path between the first face 32a and the second face 32b. Thus, the permanent magnet 50 may travel in an arcuate path between the first and second magnetic poles of the solenoid 26 in response to variations in an electrical current supplied to the solenoid 26 and/or variations in an electrical field created by the solenoid 26 proximate the gap 34.

The drive ring 18 may be coupled to the plurality of shutter blades 16 by any structure or structures known in the art. For example, as illustrated in FIG. 13, the drive ring 18 may include one or more knobs 76 and/or other structures configured to induce motion of the shutter blade 16. In an exemplary embodiment, the one or more knobs 76 of the drive ring 18 may be movably disposed in a slot or groove defined by each shutter blade 16. Each of the shutter blades 16 may also be held rotatably in place by one or more pins 52 connected to, for example, the base plate 12. In such an exemplary embodiment, the shutter blades 16 may be configured to rotate about the pin 52 in response to motion of the knob 76 connected to the drive ring 18. Motion of the one or more knobs 76 of the drive ring 18 may cause the plurality of shutter blades 16 to transition between the open and closed positions. Such an exemplary configuration may be described as a cam follower relationship and, it is understood, that any other like configuration may be utilized in the shutter assembly 300 to impart motion to the plurality of shutter blades 16.

Figure 19:
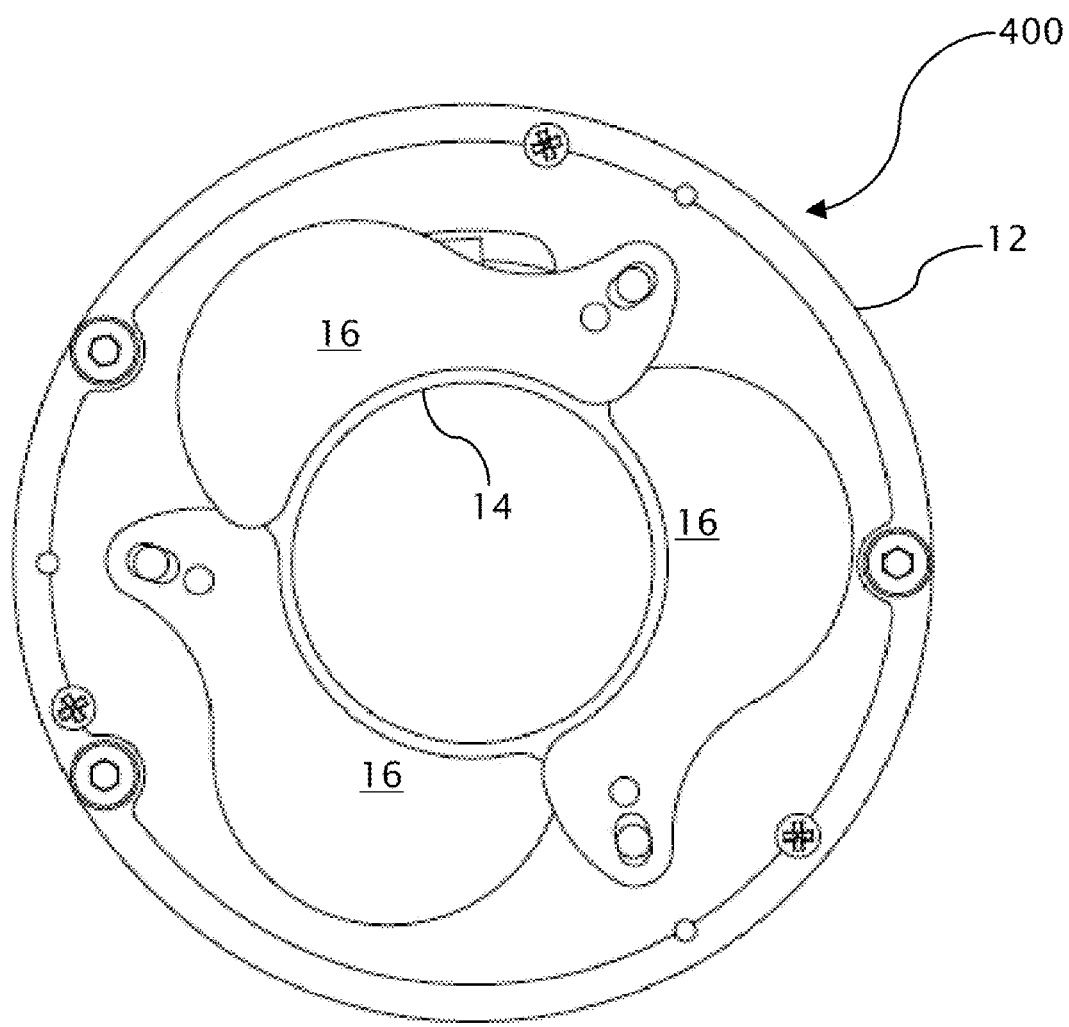
FIG. 19 is a plan view of a shutter assembly according to yet another exemplary embodiment of the present disclosure.

The shutter blades 16 may be mechanically similar to the shutter blades 16 described above with regard to FIGS. 4-11. As shown in FIG. 13, the plurality of shutter blades 16 may be disposed on a second side 86 of the base plate 12. In such an exemplary embodiment, the drive ring 18 and/or the solenoid 26 may be disposed on the first side 84 of the base plate 12 such that the plurality of shutter blades 16 is movably disposed on an opposite side of the base plate 12 therefrom. Thus, the base plate 12 may be configured to separate the plurality of shutter blades 16 from at least one of the drive ring 18 and the solenoid 26. In addition, although FIGS. 12-17 illustrate an exemplary embodiment of the shutter assembly 300 having only two shutter blades 16, it is understood that any useful number of shutter blades 16 may be incorporated into the shutter assemblies described herein. For example, as shown in FIG. 19, in an exemplary embodiment of the present disclosure a shutter assembly 400 may include three shutter blades 16. As described above, the shutter blades 16 of the present disclosure can have any shape, size, and/or other configuration known in the art. The shutter blades 16 can be, for example, half-moon shaped, tear-dropped shaped, substantially triangular, substantially square, substantially rectangular, and/or any other shape known in the art depending upon the application in which the shutter assembly is being used.

In each of the exemplary embodiments described herein, an electrical signal applied to the one or more solenoids may be increased, reduced, and/or otherwise varied. For example, an electrical current provided to the one or more solenoids may be reduced, increased, varied, modified, and/or otherwise modulated to control the movement of the one or more magnets relative to, for example, the solenoid coils, and/or the one or more dampers and/or stops. As described above, the polarity of each pole of the solenoid 26 may be controlled so as to control the motion of the magnet 50 and, thus, the drive ring 18 within the shutter assembly 300.

In an exemplary embodiment, the electrical current provided to the solenoid 26 may be increased, reduced, varied, modified, and/or otherwise modulated to control the movement of the magnet 50 relative to, for example, the first face 32a and the second face 32b. Such variations in the current may, for example, cause a related and corresponding variation in the electrical field created by the solenoid 26 between the first and second faces 32a, 32b. It is also understood that the current provided to the solenoid 26 and, thus, the magnetic field created by the solenoid 26 may be varied while transitioning the plurality of shutter blades 16 between the open and closed positions. It is also understood that the electrical current provided to the solenoid 26 and/or the magnetic field created between the first and second magnetic poles of the solenoid 26 may be altered, varied, and/or otherwise modified in response to a sensed position of the permanent magnet 50 relative to, for example, the gap 34, at least one of the faces 32a, 32b, and/or other stationary components of the shutter assembly 300.

In an exemplary embodiment, varying the electrical current applied to the solenoid 26 may include reversing a polarity of the current supplied thereto. For example, as shown in FIG. 18, the polarity of each pole of the solenoid 26 may be controllably varied by the driver 38 to controllably draw the permanent magnet 50 toward either face 32a, 32b of the solenoid 26. In an exemplary embodiment, the polarity of the current applied to the solenoid 26 may result in a south pole being formed at the first face 32a and a north pole being formed at the second face 32b, as shown in FIG. 16. Reversing the polarity of the electrical current supplied to the solenoid 26 may, in turn, form a north pole at the first face 32a and a south pole at the second face 32b, thereby drawing the magnet 50 toward the second face 32b and repelling the magnet 50 from the first face 32a. In addition, the polarity of the electrical current may be alternated and/or otherwise repeatedly reversed during the transition of the shutter blades between the open and closed positions. Such a variation in the current may cause a corresponding variation in the magnetic field created between the first and second magnetic poles of the solenoid 26, and may cause the magnet 50 to accelerate and/or decelerate as it travels between the first and second magnetic poles. For example, the polarity of the electrical current may be reversed at least once and/or repeatedly during the transitioning to magnetically dampen the movement of the magnet 50. Such variations in the electrical current and such corresponding variations in the magnetic field may alternately attract and repel the permanent magnet 50 as the permanent magnet approaches one of the first and second magnetic poles of the solenoid 26.

In addition, the current supplied to the solenoid 26 and/or the magnetic field created between the first and second magnetic poles of the solenoid 26 may be varied by, for example, applying a current pulse to the solenoid 26. In an exemplary embodiment, at least one pulse may be provided to the solenoid 26 and in additional exemplary embodiments, a plurality of pulses may be provided. In such an exemplary embodiment, the pulses applied to the solenoid 26 may be of varying widths and/or may be applied to the solenoid 26 for varying lengths of time. For example, first and second current pulses may be applied to the solenoid 26, and the first current pulse may be longer, shorter, or equal to the second pulse. As described above with regard to FIG. 7, it is understood that applying such pulses of electrical current to the solenoid 26 may controllably accelerate or controllably decelerate the magnet 50 and the drive ring 18 during movement. In particular, such pulses may be provided to controllably accelerate or decelerate the magnet 50 while transitioning the plurality of shutter blades 16 between open and closed positions. It is understood that such accelerated or decelerated movement of the magnet 50 and drive ring 18 will result in a corresponding accelerated or decelerated movement of the plurality of shutter blades 16 connected thereto. Accordingly, the amount and/or area of the central opening 14 exposed by the movement of the shutter blades 16 between the open and closed positions can be controlled through the proper timing, duration, and magnitude of such pulses.

In still another exemplary embodiment of the present disclosure, the shutter assembly 300 may include at least one sensor configured to detect a position of the permanent magnet 50 and/or a position of the drive ring 18. It is understood that such positions may be radial positions with respect to, for example, the gap 34, the faces 32a, 32b, and/or the center point 78. It is also understood that the one or more sensors may be part of a sensor assembly disposed within and/or proximate to the shutter assembly 300.

The one or more sensors may comprise any type of electromagnetic and/or position sensors known in the art. For example, as shown in FIG. 18, the sensor assembly may comprise a position sensor 80 that is mounted in a stationary location with respect to the drive ring 18. Such a position sensor may include a Hall effect sensor, an infrared sensor, and/or other known sensors. The sensor assembly may also include a magnet 82 disposed on the drive ring 18 proximate the position sensor 80. The position sensor 80 may detect the radial position of the magnet 82 disposed on the drive ring and may send a feedback signal to, for example, a driver 38. From such feedback signals, the driver 38 may determine the positions of, for example, the drive ring 18, the magnet 50, and/or the plurality of shutter blades 16. In response to such calculated positions, the driver 38 may, for example, send a desired electrical current to the solenoid 26 via the control lines 92, 94. In particular, the driver 38 may alter, modify, vary, and/or otherwise adjust the current provided to the solenoid 26 in response to the sensed and/or calculated position of the shutter blades 16. Varying the current in this way may cause a corresponding variation in the magnetic field created by the solenoid 26.

Accordingly, in the exemplary embodiment illustrated in FIG. 18, the shutter assembly 300 may be servo driven and may incorporate one or more feedback control loops as part of the preprogrammed logic used to control motion and/or position of the shutter blades 16. In such an exemplary embodiment, the driver 38 may be preprogrammed with a desired set point corresponding to, for example, a position of the shutter blades 16 at the open or closed position. The position sensor 80 may then detect the position of the magnet 82, and the driver 38 may convert this position information to an acceptable format for comparison with the preprogrammed set point. The driver 38 may compare the converted position value with the preprogrammed set point, and if the preprogrammed set point is greater than the sensed position value, the driver 38 may direct an electrical current to the solenoid 26 to rotate the magnet 50 and drive ring 18 in the direction of arrow 44 (FIG. 12). Alternatively, if the preprogrammed set point is less than the sensed position point, the driver 38 may send an electrical current to the solenoid 26 rotating the drive ring 18 and magnet 50 in the direction of arrow 46 (FIG. 14). Such feedback control may continue until the shutter blades 16 are desirably opened or desirably closed.

In an additional exemplary embodiment, the sensor 80 may be positioned proximate the magnet 50, and in such an exemplary embodiment, the magnet 82 may be omitted. In still another exemplary embodiment, the sensor 80 may comprise a current sensor configured to sense at least one property of an electrical current passing through the solenoid 26. Such a property may include, for example, a voltage of the electrical current and/or a flow of electrical charge (Amperes).

In still another embodiment of the present disclosure, the sensor 80 may comprise a micromagnet mounted to one or more of the shutter blades 16, and a corresponding transponder mounted to a stationary component of the shutter assembly 300 to detect the relative position of the micromagnet. In still a further embodiment, the sensor assembly may comprise a flag or other structure mounted to, for example, the drive ring 18, the magnet 50, and/or one or more of the shutter blades 16. In such an exemplary embodiment, the sensor assembly may further include a corresponding sensor 80 configured to detect the position of the flag. In each of the embodiments of the sensor assembly discussed above, the driver 38 may receive feedback signals produced by the one or more components of the sensor assembly based on, for example, the change in position of the sensor assembly components and/or a change in the electrical current provided to the solenoid 26. The feedback received from the sensor 80 may be utilized to detect and/or otherwise assist in controlling the position of the magnet 50, thereby controlling the position of the shutter blades 16 in a closed loop manner. The driver 38 may alter the current directed to the solenoid 26 to control the position of the magnet 50 within and/or otherwise relative to the gap 34.

In an exemplary embodiment of the present disclosure, the shutter assemblies 200, 300, 400 may be used to open and close shutter blades 16 in one or more photographic device applications. For example, the shutter assemblies 200, 300, 400 may be utilized to expose photographic film to light for a desired period of time, thereby forming an image on the film. In such an application, the shutter assemblies 200, 300, 400 may be components utilized in a camera or other like photographic device.

As explained with respect to FIGS. 1-11, the driver 38 may direct an electrical current to the solenoid 26 via the wire 28. The current directed to the solenoid 26 may form, for example, a north pole at the operative face 32a and a south pole at the operative face 32b, as shown in FIG. 9. In such an exemplary embodiment, the north pole N of the magnet 50 may be repelled by the north pole of the operative face 32a, and the south pole S of the magnet 50 may be repelled by the south pole defined by the operative face 32b. Thus, the magnet 50 may be at least partially repelled from the gap 34 and may be forced adjacent to the stop 64. Repelling the magnet 50 at least partially from the gap 34 may cause the plurality of shutter blades 16 to achieve the closed position illustrated in FIG. 7. In particular, controlling the operative faces 32a, 32b to have the polarities shown in FIG. 9 may repel the magnet 50 in the direction of arrow 58 such that the knob 66 of the magnet 50 may travel in the slots 54 defined by the shutter blades 16, in the direction of arrow 58, thereby closing the shutter blades 16. Each of the plurality of shutter blades 16 is movably connected to the pin 52 and, thus, movement of the magnet 50 in the direction of arrow 58 within the slot 54 may move the plurality of shutter blades 16 about the pin 52 to achieve the closed position illustrated in FIG. 7.

To transition the shutter 200 to the open position illustrated in FIG. 4, and thereby expose and/or otherwise open the shutter opening 14, the driver 38 may be controlled to reverse the polarity of the poles of the solenoid 26. In particular, the driver 38 may direct a current to the solenoid 26 defining a south pole at the operative face 32a and a north pole at the operative face 32b. The south pole defined by the operative face 32a may attract the north pole N of the magnet 50 and the north pole defined by the operative face 32b may attract the south pole S of the magnet 50. Accordingly, the magnet 50 may travel in the direction of arrow 56 and may be drawn into the gap 34. Movement of the magnet 50 into the gap 34 may be restricted by the stop 65. In particular, the stop 65 may prohibit the poles N, S of the magnet 50 from moving into a position aligned with the poles defined by the first and second operative faces 32a, 32b of the solenoid 26. As shown in at least FIGS. 6 and 11, the stop 65 may be positioned to prohibit the center line 70 of the poles N, S of the magnet 50 from aligning with the center line 68 of the solenoid 26.

Drawing the magnet 50 at least partially into the gap 34 defined by the first and second poles of the solenoid 26 causes the plurality of shutter blades 16 movably connected to the magnet 50 to achieve the open position illustrated in FIG. 4. In particular, the knob 66 of the magnet 50 may travel in the direction of arrow 56 within the slot 54 of the shutter blades 16 so as to substantially expose and/or otherwise open the shutter opening 14. Each of the shutter blades 16 may also pivot and/or otherwise move about the pin 52 when transitioning between the open and closed positions described herein.

As described above, in transitioning the shutter 200 between the open and closed positions, the magnet 50 may move in a path coplanar with the solenoid 26 and substantially perpendicular to the central axis 60 of the solenoid 26 in response to the polarities of the first and second poles of the solenoid 26. Because the poles N, S of the magnet 50 are prohibited from moving into a position aligned with the first and second poles of the solenoid 26 when the magnet 50 is drawn into the gap 34, simply reversing the polarity of the poles defined by the operative faces 32a, 32b of the solenoid 26 may provide ample electromagnetic force to effectively repel the magnet 50 from the gap 34. In an alternative embodiment in which the poles N, S of the magnet 50 were permitted to substantially align with the poles defined by the operative faces 32a, 32b, simply reversing the polarity of the poles defined by the operative faces 32a, 32b may not cause the magnet 50 to travel in the direction of either arrow 56 or arrow 58. In such an exemplary embodiment, an additional mechanism may be required to induce movement of the magnet 50 and/or the shutter blades 16.

Moreover, as described above with respect to FIGS. 12-19, the electrical current applied to the solenoid 26 and the magnetic field created between the first and second magnetic poles of the solenoid 26 may be varied while the plurality of shutter blades 16 is transitioned between the open and closed positions. Such variations may be controlled by the user as desired in order to produce a variable shutter opening and/or shutter closing pattern as necessary for different shutter assembly applications. For example, the shutter blades 16 may be controlled to accelerate and/or decelerate while transitioning between the open and closed positions. Such accelerations may be, for example, linear, stepwise, and/or exponential. Alternatively, the plurality of shutter blades 16 may be controlled during the transitioning to have any other velocity, acceleration, and/or movement pattern useful in shutter applications. It is also understood that the movement of the shutter blades 16 may cause a corresponding change in the area of the central opening 14 exposed by the shutter assembly 300. Thus, the area of the central opening 14 that is exposed by the shutter assembly 300 may be varied, for example, in a linear, stepwise, exponential, and/or other manner as dictated by the controlled movement of the plurality of shutter blades 16.

As is also discussed above, the acceleration, deceleration, and/or other movement of the shutter blades 16 may be controlled using a closed loop feedback control strategy. For example, the shutter assembly may be servo-driven to assist in accelerating, decelerating, and/or otherwise modifying the movement of the plurality of shutter blades 16 while transitioning the plurality of shutter blades 16 between the open and closed positions. It is understood that the shutter assemblies 200, 300, 400 described herein may comprise any combination of sensors, sensor components, and/or other devices to facilitate the closed loop control of the position and/or movement of, for example, the drive ring 18, the permanent magnet 50, and/or the plurality of shutter blades 16.

Other embodiments of the disclosed shutter will be apparent to those skilled in the art from consideration of this specification. It is intended that this specification and examples be considered as exemplary only, with the true scope of the invention being indicated by the following claims.

The invention claimed is:

1. A shutter assembly comprising:
   a) a substantially annular solenoid including a first face and a second face facing the first face, the first face defining a first magnetic pole of the solenoid and the second face defining a second magnetic pole of the solenoid;
   b) a drive ring disposed coplanar and substantially concentric with the solenoid such that the drive ring and the solenoid share a common central axis;
   c) a permanent magnet fixed to the drive ring, the drive ring configured to rotate in response to activation of the solenoid; and
   d) a plurality of shutter blades configured to transition between an open position and a closed position in response to rotation of the drive ring.

2. The shutter assembly of claim 1, wherein the solenoid and the drive ring are separated from the plurality of shutter blades by a base plate.

3. The shutter assembly of claim 2, wherein the base plate defines a substantially annular channel and the drive ring is disposed within the channel.

4. The shutter assembly of claim 2, wherein the base plate defines a stop, the drive ring impacting the stop at one of the open and closed positions such that rotation of the drive ring is limited by the stop upon impact.

5. The shutter assembly of claim 4, wherein the drive ring defines an extension impacting the stop at one of the open and closed positions.

6. The shutter assembly of claim 1, wherein the permanent magnet is configured to travel in an arcuate path between the first and second magnetic poles of the solenoid.

7. The shutter assembly of claims 6, further comprising a sensor configured to detect a position of the permanent magnet.

8. The shutter assembly of claim 1, wherein the solenoid substantially encircles the drive ring.

9. The shutter assembly of claim 1, wherein the solenoid spans greater than about 270 degrees of the central axis.

10. The shutter assembly of claim 1, wherein the solenoid defines a gap extending from the first face to the second face, and wherein electromagnetic magnetic flux lines of the solenoid may travel within the gap substantially directly between the first and second magnetic poles of the solenoid.

11. The shutter assembly of claim 1, wherein the solenoid defines a substantially annular centerline, the centerline of the solenoid passing through a magnetic center of the first magnetic pole and a magnetic center of the second magnetic pole.

12. The shutter assembly of claim 1, wherein the permanent magnet includes a first flat surface defining a north pole and a second flat surface defining a south pole.

13. The shutter assembly of claim 12, wherein the permanent magnet defines a longitudinal centerline, the centerline of the permanent magnet passing through a magnetic center of the north pole and a magnetic center of the south pole.

14. The shutter assembly of claim 13, wherein the centerline of the permanent magnet is substantially perpendicular to the first and second flat surfaces.

15. The shutter assembly of claim 1, wherein the drive ring includes a knob contacting at least one shutter blade of the plurality of shutter blades.

16. The shutter assembly of claim 15, wherein the knob extends substantially through the at least one shutter blade.

* * * * *